United States Patent
Okano et al.

(10) Patent No.: US 11,562,770 B2
(45) Date of Patent: Jan. 24, 2023

(54) DISK DEVICE AND ELECTRONIC DEVICE WITH INTERNAL SPACE IN HOUSING

(71) Applicants: Kabushiki Kaisha Toshiba, Tokyo (JP); Toshiba Electronic Devices & Storage Corporation, Tokyo (JP)

(72) Inventors: Taichi Okano, Yokohama Kanagawa (JP); Masahide Takazawa, Yokohama Kanagawa (JP); Jai Liu, Yokohama Kanagawa (JP); Nobuhiro Yamamoto, Yokohama Kanagawa (JP); Kota Tokuda, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/469,383

(22) Filed: Sep. 8, 2021

(65) Prior Publication Data

US 2022/0301591 A1    Sep. 22, 2022

(30) Foreign Application Priority Data

Mar. 18, 2021   (JP) .............................. JP2021-045082

(51) Int. Cl.
  *G11B 25/04*    (2006.01)
  *G11B 23/30*    (2006.01)
  (Continued)

(52) U.S. Cl.
  CPC .......... *G11B 25/043* (2013.01); *G11B 5/4853* (2013.01); *G11B 23/30* (2013.01); *G11B 33/122* (2013.01)

(58) Field of Classification Search
  CPC .... G06F 1/1698; G06F 13/16; G06F 13/1668; G06F 2213/0032; G11B 33/122;
  (Continued)

(56) References Cited

U.S. PATENT DOCUMENTS 5,736,728 A * 4/1998 Matsubara ......... G06K 19/0701
                                                                 235/492
7,864,122 B2 * 1/2011 Kobayashi ............... H01Q 9/30
                                                                 343/702
(Continued)

FOREIGN PATENT DOCUMENTS

JP    2000-149404 A    5/2000
JP    2000-284869 A    10/2000
(Continued)

*Primary Examiner* — Brian E Miller
(74) *Attorney, Agent, or Firm* — Allen & Overy LLP

(57) ABSTRACT

According to one embodiment, a disk device includes a housing, recording medium, a magnetic head, an internal wireless communication device, and an internal component. The housing has an internal space. The internal wireless communication device generates at least either of: an electric signal representing information to be written to the recording medium, the electric signal corresponding to light, a magnetic field, or an electric field generated by an external wireless communication device; and light, a magnetic field, or an electric field toward the external wireless communication device, the light, the magnetic field, or the electric field corresponding to an electric signal representing information read from the recording medium. The internal component in the internal space is electrically connected to the magnetic head, the internal component that communicates with an external component located outside the housing through the internal wireless communication device and the external wireless communication device.

9 Claims, 14 Drawing Sheets

(51) Int. Cl.
*G11B 5/48* (2006.01)
*G11B 33/12* (2006.01)

(58) Field of Classification Search
CPC ..... G11B 25/043; G11B 5/4853; G11B 23/30; H05K 1/147; H05K 2201/10098; H05K 2201/10189
See application file for complete search history.

(56) References Cited

U.S. PATENT DOCUMENTS

| | | | | |
|---|---|---|---|---|
| 9,196,303 | B2* | 11/2015 | Hirano | G11B 33/122 |
| 9,886,985 | B1* | 2/2018 | Okamoto | G11B 33/1466 |
| 2003/0080906 | A1* | 5/2003 | Miyasaka | H01Q 9/0407 |
| | | | | 343/702 |
| 2004/0004145 | A1* | 1/2004 | Stamm | G11B 23/107 |
| | | | | 242/348 |
| 2004/0041711 | A1 | 3/2004 | Loewidt | |
| 2005/0094312 | A1* | 5/2005 | Sato | G11B 5/5521 |
| 2008/0055166 | A1* | 3/2008 | Kobayashi | H05K 1/181 |
| | | | | 343/702 |
| 2008/0318447 | A1* | 12/2008 | Tomioka | H01Q 1/243 |
| | | | | 439/76.1 |
| 2011/0158344 | A1* | 6/2011 | Kawamura | H01P 5/028 |
| | | | | 375/295 |
| 2012/0295539 | A1* | 11/2012 | McCormack | H04B 5/02 |
| | | | | 455/39 |
| 2015/0085903 | A1* | 3/2015 | Gundel | H05K 5/0026 |
| | | | | 375/219 |
| 2015/0098178 | A1* | 4/2015 | Otake | H01R 43/0235 |
| | | | | 228/256 |
| 2015/0257293 | A1 | 9/2015 | Hirano et al. | |
| 2018/0097301 | A1* | 4/2018 | Yoshida | H01R 13/05 |
| 2018/0337477 | A1* | 11/2018 | Yamamoto | H01R 13/2407 |
| 2020/0402545 | A1* | 12/2020 | Kaneko | G11B 33/1466 |
| 2021/0225412 | A1* | 7/2021 | Okano | G06F 1/1698 |
| 2021/0287721 | A1* | 9/2021 | Toukairin | H05K 5/04 |
| 2021/0295876 | A1* | 9/2021 | Okano | H02J 50/40 |
| 2021/0407550 | A1* | 12/2021 | Okano | G06F 1/26 |
| 2022/0037761 | A1* | 2/2022 | Liu | G11B 33/022 |
| 2022/0247064 | A1* | 8/2022 | Liu | G11B 33/148 |

FOREIGN PATENT DOCUMENTS

| | | |
|---|---|---|
| JP | 2004-517397 A | 6/2004 |
| JP | 2015-181080 A | 10/2015 |

\* cited by examiner

DISK DEVICE AND ELECTRONIC DEVICE WITH INTERNAL SPACE IN HOUSING

CROSS-REFERENCE TO RELATED APPLICATIONS

This application is based upon and claims the benefit of priority from Japanese Patent Application No. 2021-045082, filed on Mar. 18, 2021; the entire contents of which are incorporated herein by reference.

FIELD

Embodiments described herein relate generally to a disk device and an electronic device.

BACKGROUND

As for disk devices such as a hard disk drive, their housings are typically sealed. For the purpose of communications between the inside and outside of the housing, such a housing is provided with a through-hole, and a connector is mounted on a substrate hermetically closing the through-hole. For example, components outside and inside the housing communicate with each other through the connector.

For example, as the storage capacity of the disk device increases, the number of terminals of the connector increases. The increase in the number of terminals may result in increasing the connector, the substrate, and the through-hole in size, impairing the sealing performance of the housing.

DETAILED DESCRIPTION

In general, according to one embodiment, a disk device includes a housing, a disk-shaped recording medium, a magnetic head, an internal wireless communication device, and an internal component. The housing has an internal space. The recording medium is housed in the internal space, and includes a recording layer. The magnetic head is housed in the internal space, the magnetic head configured to read and write information from and to the recording medium. The internal wireless communication device generates at least either of: an electric signal representing information to be written to the recording medium by the magnetic head, the electric signal corresponding to light, a magnetic field, or an electric field generated by an external wireless communication device; and light, a magnetic field, or an electric field toward the external wireless communication device, the light, the magnetic field, or the electric field corresponding to an electric signal representing information read from the recording medium by the magnetic head. The internal component is housed in the internal space and is electrically connected to the magnetic head, the internal component that communicates with an external component located outside the housing through the internal wireless communication device and the external wireless communication device.

First Embodiment

Hereinafter, a first embodiment will be described with reference to FIGS. 1 to 6. Note that, in some cases, a plurality of expressions is given for elements according to the embodiments and for description thereof, in the present specification. The elements and the description thereof are presented by way of example only, and the elements and description thereof are not limited by the expressions in the present specification. The elements can be identified by names different from those herein as well. In addition, different expressions from that in the present specification can be given for the elements.

Figure 1:
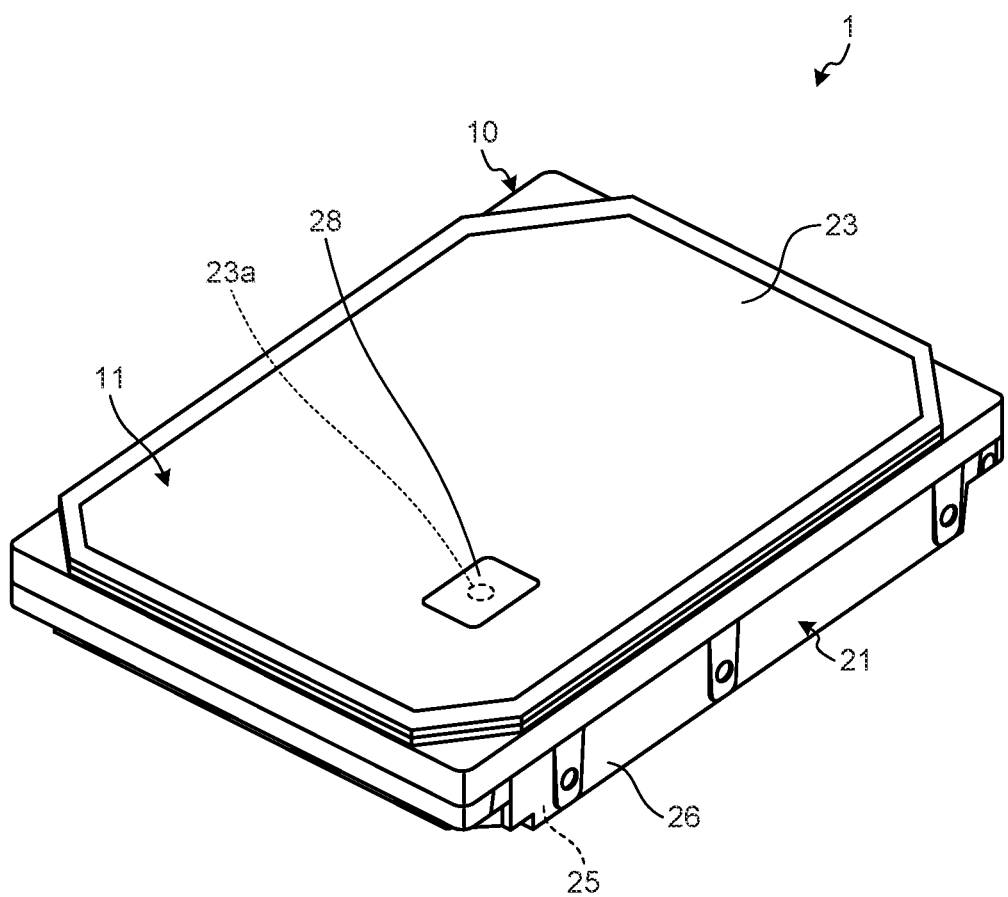
FIG. 1 is an exemplary perspective view illustrating a hard disk drive (HDD) according to a first embodiment.

FIG. 1 is an exemplary perspective view illustrating a hard disk drive (HDD) 10 according to the first embodiment. The HDD 10 is incorporated in, for example, an electronic device 1 and constitutes part of the electronic device 1. In other words, the electronic device 1 includes the HDD 10.

The HDD 10 is an example of the disk device and may also be referred to as a storage device or a magnetic disk device. Examples of the electronic device 1 include various computers, such as a personal computer, supercomputer, server, TV set, and game machine, and a device, such as an external hard drive (HDD).

Figure 2:
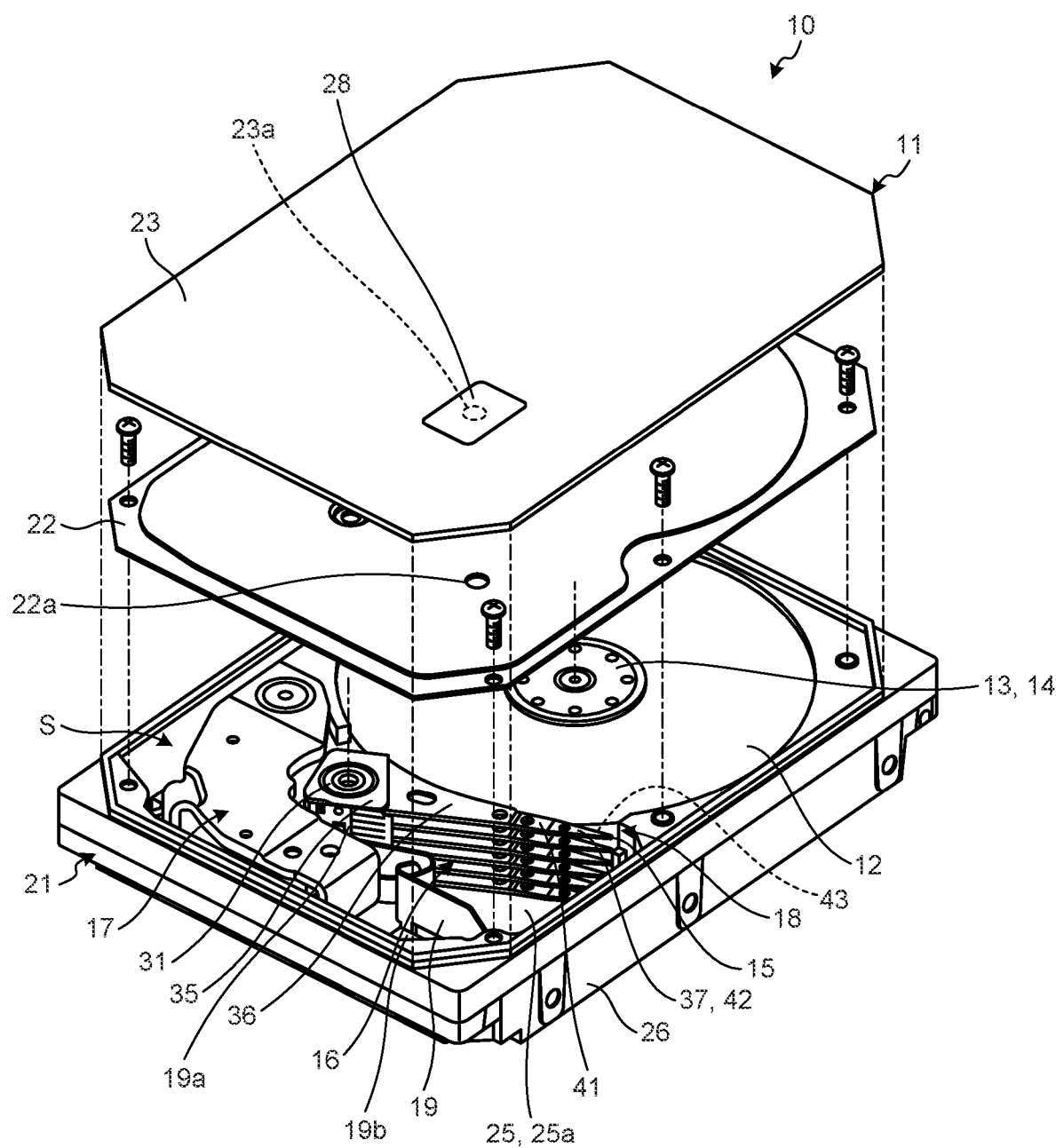
FIG. 2 is an exemplary exploded perspective view of the HDD according to the first embodiment.

FIG. 2 is an exemplary exploded perspective view of the HDD 10 according to the first embodiment. As illustrated in FIG. 2, the HDD 10 includes a housing 11, a plurality of magnetic disks 12, a spindle motor 13, a clamp spring 14, a plurality of magnetic heads 15, an actuator assembly 16, a voice coil motor (VCM) 17, a ramp load mechanism 18, and a flexible printed circuit (FPC) board 19. Each of the magnetic disks 12 is an example of the recording medium. The spindle motor 13 is an example of a motor.

The housing 11 includes a base 21, an inner cover 22, and an outer cover 23. The base 21 is a bottomed container and includes a bottom wall 25 and sidewalls 26. The bottom wall 25 is an example of a first wall. The bottom wall 25 has substantially a rectangular (quadrangular) plate shape. The sidewalls 26 protrude from the outer edge of the bottom wall 25. The bottom wall 25 and the sidewalls 26 are integrally formed of a metal material such as an aluminum alloy.

The inner cover 22 and the outer cover 23 are formed of a metal material such as an aluminum alloy. The inner cover 22 is attached to an end of the sidewalls 26, for example, with screws. The outer cover 23 covers the inner cover 22 and is hermetically fixed to the end of the sidewalls 26, for example, by welding.

The housing 11 has an internal space S. The internal space S is formed (defined, enclosed) by the base 21 and the inner cover 22. The housing 11 according to the present embodiment hermetically seals the internal space S, and prevents or reduces a flow of gas between the internal space S and the outside of the housing 11.

The housing 11 houses the magnetic disks 12, the spindle motor 13, the clamp spring 14, the magnetic heads 15, the actuator assembly 16, the voice coil motor 17, the ramp load mechanism 18, and the FPC 19 in the internal space S. The internal space S and the magnetic disks 12, the spindle motor 13, the clamp spring 14, the magnetic heads 15, the actuator assembly 16, the voice coil motor 17, the ramp load mechanism 18, and the FPC 19 housed in the internal space S are covered by the bottom wall 25 and sidewalls 26 of the base 21 and the inner cover 22.

The inner cover 22 is provided with a vent 22a. The outer cover 23 is provided with a vent 23a. After the components are attached to the base 21 and the inner cover 22 and the outer cover 23 are attached to the base 21, air is removed from the internal space S through the vents 22a and 23a. The internal space S is filled with a gas different from the air.

Examples of the gas with which the internal space S is filled include a low density gas being lower in density than the air and an inert gas with low reactivity. For example, the internal space S is filled with helium. Note that the internal space S may be filled with another fluid. In addition, the internal space S may be maintained in a vacuum state, at a low pressure closer to the vacuum state, or at a negative pressure lower than atmospheric pressure.

The vent 23a of the outer cover 23 is closed by a seal 28. The seal 28 is formed of, for example, a metal or a synthetic resin. The seal 28 hermetically seals the vent 23a and prevents the gas from leaking from the internal space S through the vent 23a.

Each of the magnetic disks 12 is, for example, a disk including a magnetic recording layer on at least one of an upper surface and a lower surface. The magnetic disk 12 has a diameter of, for example, 3.5 inches, but is not limited to this example.

The spindle motor 13 supports and rotates the magnetic disks 12 stacked on each other at intervals. The clamp spring 14 holds the magnetic disks 12 on the hub of the spindle motor 13.

The magnetic heads 15 record and reproduce information on and from the recording layers of the corresponding magnetic disks 12. In other words, the magnetic heads 15 read and write information from and to the corresponding magnetic disks 12. The magnetic heads 15 are supported by the actuator assembly 16.

The actuator assembly 16 is rotatably supported by a support shaft 31 spaced apart from the magnetic disks 12. The VCM 17 rotates the actuator assembly 16 to place the actuator assembly 16 to a desired position. When the rotation of the actuator assembly 16 by the VCM 17 moves the magnetic heads 15 to outermost peripheries of the magnetic disks 12, the ramp load mechanism 18 holds the magnetic heads 15 at an unload position away from the magnetic disks 12.

The actuator assembly 16 includes an actuator block 35, a plurality of arms 36, and a plurality of head suspension assemblies 37. Each of the head suspension assemblies 37 may also be referred to as a head gimbal assembly (HGA).

The actuator block 35 is rotatably supported by the support shaft 31, for example, via a bearing. The arms 36 protrude from the actuator block 35 in a direction substantially orthogonal to the support shaft 31. Note that the actuator assembly 16 may be divided so that the arms 36 may protrude from the corresponding actuator blocks 35.

The arms 36 are spaced from each other in a direction in which the support shaft 31 extends. Each of the arms 36 has a plate shape so as to enter the gap between the adjacent magnetic disks 12. The arms 36 extend substantially in parallel.

The actuator block 35 and the arms 36 are integrally formed of, for example, aluminum. Note that the material of the actuator block 35 and the arms 36 is not limited to this example.

The actuator block 35 is provided with a protrusion on which a voice coil of the VCM 17 is placed. The VCM 17 includes a pair of yokes, a voice coil placed between the yokes, and a magnet set on each of the yokes.

The head suspension assemblies 37 are attached to distal ends of the corresponding arms 36 and protrude from the arms 36. The head suspension assemblies 37 are thus arranged at intervals in the direction in which the support shaft 31 extends.

Each of the head suspension assemblies 37 includes a base plate 41, a load beam 42, and a flexure 43. The magnetic heads 15 are attached to the head suspension assemblies 37.

The base plate 41 and the load beam 42 are formed of, for example, stainless steel. Note that the material of the base plate 41 and the load beam 42 are not limited to this example. The base plate 41 is attached to the distal end of the arm 36. The load beam 42 has a plate shape thinner in thickness than the base plate 41. The load beam 42 is attached to the distal end of the base plate 41 and protrudes from the base plate 41.

The flexure 43 has an elongated strip shape. Note that the shape of the flexure 43 is not limited to this example. The flexure 43 is a layered plate including a metal plate (backing layer) formed of stainless steel or the like, an insulating layer formed on the metal plate, a conductive layer formed on the insulating layer, and constituting a plurality of interconnections (interconnect pattern), and a protective layer (insulating layer) covering the conductive layer.

The flexure 43 includes, at one end, a displaceable gimbal (elastic support) above the load beam 42. The magnetic head 15 is mounted on the gimbal. The other end of the flexure 43 is connected to the FPC 19. Thus, the FPC 19 is electrically connected to the magnetic heads 15 via the interconnections of the flexures 43.

Figure 3:
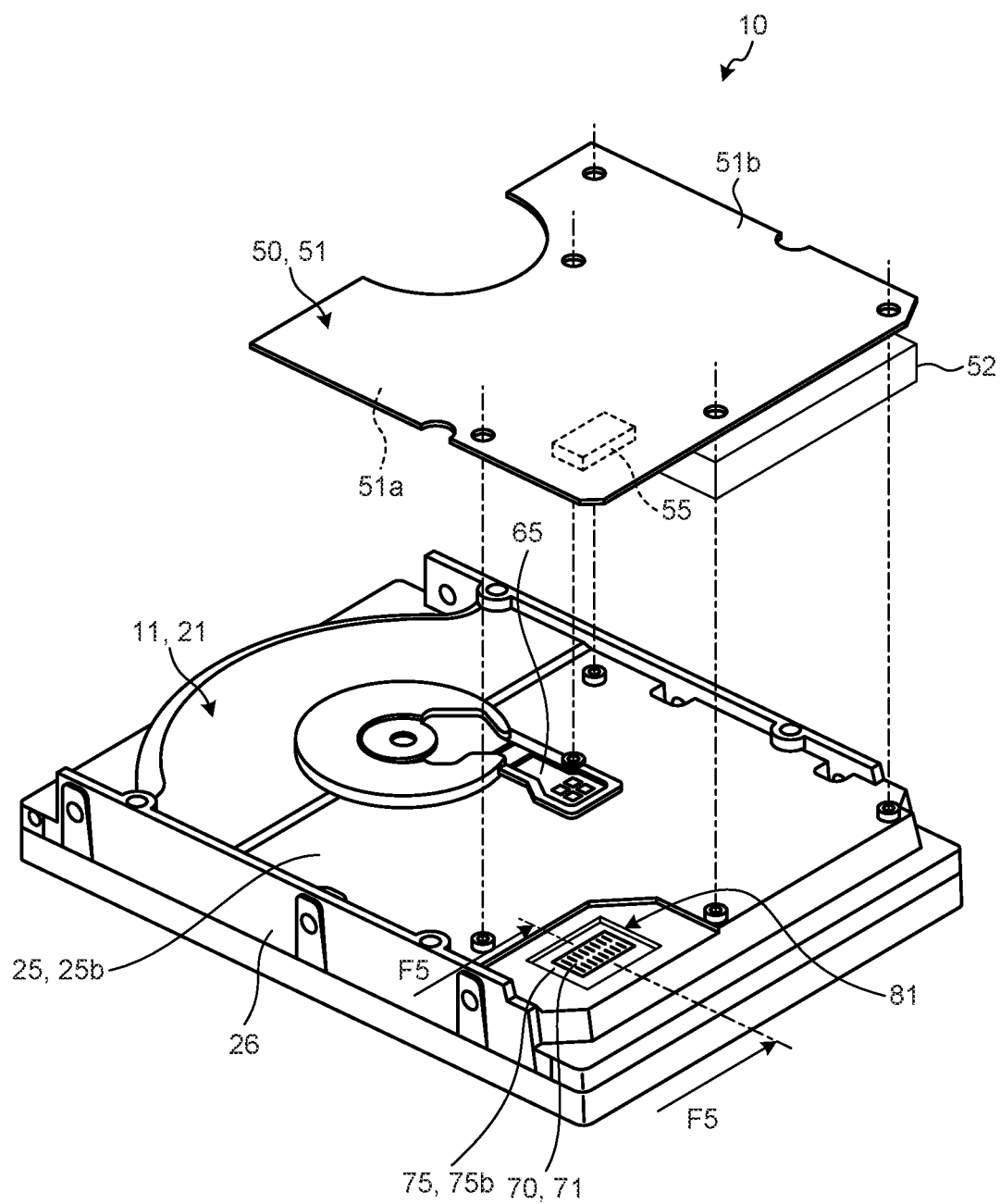
FIG. 3 is an exemplary exploded perspective view of the HDD according to the first embodiment, illustrated from a direction different from that in FIG. 2.

FIG. 3 is an exemplary exploded perspective view of the HDD 10 according to the first embodiment, illustrated from a direction different from that in FIG. 2. As illustrated in FIG. 3, the HDD 10 further includes a printed circuit board (PCB) 50. The PCB 50 is an example of the external component. The PCB 50 is placed outside the bottom wall 25 of the base 21.

The PCB 50 includes a printed wiring board (PWB) 51. Examples of the PWB 51 includes a rigid board such as a glass epoxy board, a multi-layer board, and a build-up board. The PWB 51 is an example of a first circuit board and a second circuit board. Note that the first circuit board and the second circuit board may be another board such as an FPC.

The PWB 51 is attached to the outside of the bottom wall 25. In other words, the PWB 51 is attached to the outside of the housing 11. The PWB 51 is attached to the bottom wall 25 by, for example, screwing or snap-fitting with hooks.

Figure 4:
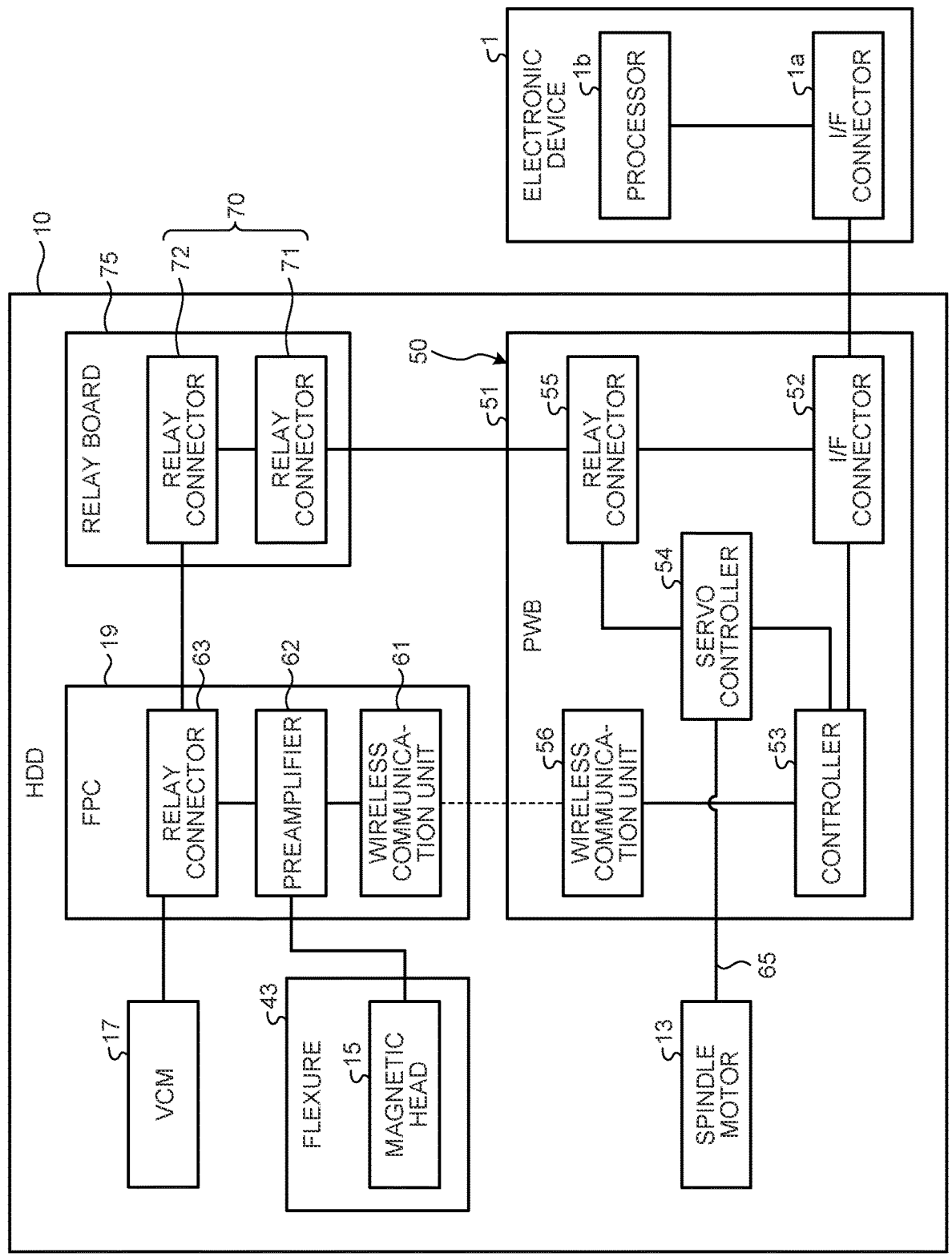
FIG. 4 is an exemplary block diagram illustrating a configuration of the HDD according to the first embodiment.

FIG. 4 is an exemplary block diagram illustrating a configuration of the HDD 10 according to the first embodiment. As illustrated in FIG. 4, the PCB 50 further includes an interface (I/F) connector 52, a controller 53, a servo controller 54, a relay connector 55, and a wireless communication unit 56.

The I/F connector 52, the controller 53, the servo controller 54, the relay connector 55, and the wireless communication unit 56 are mounted on the PWB 51. In addition, various memories such as RAM, ROM, and a buffer memory, a coil, a capacitor, and other electronic components are further mounted on the PWB 51.

The I/F connector 52 is a connector in conformity with an interface standard such as Serial ATA, and is connected to an I/F connector 1a of the electronic device 1. The PWB 51 is thus electrically connected to a processor 1b of the electronic device 1. The processor 1b is, for example, a central processing unit (CPU) and controls the electronic device 1 as a whole.

The HDD 10 receives a supply of power, access commands (control signals) such as a write command and a read command, and various kinds of data from the electronic device 1 through the I/F connector 52. The HDD 10 transmits various kinds of data to the electronic device 1 through the I/F connector 52. In this manner, the PCB 50 performs wired communications with the electronic device 1 through the I/F connector 52. Note that the HDD 10 may be configured to perform wireless communications with the electronic device 1.

The controller 53 includes, for example, a read/write channel (RWC), a hard disk controller (HDC), and a processor. The controller 53 may be one component or may be a collective term for the RWC, HDC, and processor, which are independent from each other. The controller 53 controls the HDD 10 as a whole.

The servo controller 54 drives the spindle motor 13 and the VCM 17. The relay connector 55 is used, for example, for supplying power to various components arranged in the internal space S. The wireless communication unit 56 transmits and receives data to and from the components mounted on the FPC 19.

A wireless communication unit 61, a preamplifier 62, and a relay connector 63 are mounted on the FPC 19. That is, the wireless communication unit 61, the preamplifier 62, and the relay connector 63 are housed in the internal space S. The preamplifier 62 is an example of the internal component.

The wireless communication unit 61 wirelessly communicates with the wireless communication unit 56 outside the housing 11. The preamplifier 62 is electrically connected to the magnetic heads 15. Note that the preamplifier 62 may be mounted on the flexure 43.

In reading data, the preamplifier 62 amplifies and outputs an electric signal (read signal) corresponding to data read from each magnetic disk 12 by the corresponding magnetic head 15. The wireless communication unit 61 supplies the read signal amplified by the preamplifier 62 to the RWC of the controller 53 through the wireless communication unit 56.

Furthermore, the preamplifier 62 amplifies an electric signal (write signal) corresponding to data to be written supplied from the RWC of the controller 53 through the wireless communication units 56 and 61. The preamplifier 62 supplies the signal to each magnetic head 15.

As described above, the preamplifier 62 communicates (transmits and receives data) with the controller 53 of the PCB 50 outside the housing 11 via the wireless communication units 56 and 61. Note that in the present embodiment, the term "communication" represents transmission and reception of information between independent elements. The preamplifier 62 does not perform various controls such as signal conversion for the communication. The preamplifier 62 and the PCB 50 have a relationship that when one of the preamplifier 62 and the PCB 50 outputs a signal, the other receives a signal corresponding to the output signal.

The relay connector 63 receives a supply of power via the relay connector 55 of the PWB 51. In the present embodiment, the magnetic heads 15, and the wireless communication unit 61 and preamplifier 62 of the FPC 19 operate by the power supplied via the relay connector 63.

In the controller 53 of the PCB 50, the HDC performs, for example, control of transmission and reception of data to and from the electronic device 1 through the I/F connector 52, control of a buffer memory, and error correction to read data.

The RWC of the controller 53 modulates the data to be written supplied from, for example, the HDC and supplies the modulated data to the preamplifier 62 through the wireless communication units 56 and 61. Furthermore, the RWC demodulates the signal read from the magnetic disk 12 and supplied from the preamplifier 62 through the wireless communication units 56 and 61, and outputs the demodulated signal as digital data to the HDC.

The processor of the controller 53 is, for example, a CPU. The processor controls the overall HDD 10 according to, for example, firmware prestored in the ROM and the magnetic disks 12. For example, the processor loads the firmware from the ROM and each magnetic disk 12 into the RAM, and controls the magnetic heads 15, the servo controller 54, the wireless communication units 56 and 61, the preamplifier 62, the RWC, the HDC, and other components according to the loaded firmware.

The HDD 10 further includes a wired connection 70. The wired connection 70 is an example of a connection. The wired connection 70 electrically connects the magnetic heads 15, the FPC 19, the wireless communication unit 61, and the preamplifier 62 located in the internal space S to the PCB 50 located outside the housing 11. The wired connection 70 includes two relay connectors 71 and 72. The relay connector 71 is an example of a first connector. The relay connector 72 is an example of a second connector.

The housing 11 includes a relay board 75. The relay board 75 is an example of a second wall. The relay board 75 is attached to the base 21 of the housing 11. The relay connectors 71 and 72 are mounted on the relay board 75. The relay connectors 71 and 72 are electrically connected to each other, for example, through a conductor penetrating the relay board 75.

The relay connector 71 is located outside the housing 11. The relay connector 71 is connected to the relay connector 55 of the PCB 50. In other words, the relay connector 71 is electrically connected to the PCB 50.

The relay connector 72 is located in the internal space S. The relay connector 72 is connected to the relay connector 63 of the FPC 19. The relay connector 72 is electrically connected to the preamplifier 62 and each magnetic head 15 through the FPC 19.

The FPC 19, the wireless communication unit 61 and the preamplifier 62 mounted on the FPC 19, and each magnetic head 15 mounted on the flexure 43 receive power from the electronic device 1 through the relay connectors 55, 63, 71, and 72 and the I/F connector 52. In other words, the magnetic head 15, the FPC 19, and the wireless communication unit 61 is supplied with power from the PCB 50 through the relay connectors 71 and 72.

The relay connectors 55, 63, 71, and 72 include a plurality of pins (terminals) and interconnections, for supplying power (a power supply) and grounding. The relay connectors 55, 63, 71, and 72 may further include a plurality of pins and interconnections for supplying power, grounding, and controlling the VCM 17.

As described above, the relay connectors 55, 63, 71, and 72 according to the present embodiment are used for supplying power to the various components arranged in the internal space S of the housing 11. Note that the relay connectors 55, 63, 71, and 72 may be provided with pins and interconnections for data communications among the components mounted on the FPC 19 and the PCB 50.

As illustrated in FIG. 3, the HDD 10 further includes a relay FPC 65. The relay FPC 65 is located in the vicinity of the spindle motor 13, passes through a hole penetrating the bottom wall 25 of the base 21, and extends across the internal space S and the outside of the housing 11. The hole is sealed with, for example, a synthetic resin.

The relay FPC 65 electrically connects, for example, the servo controller 54 of the PCB 50 to the spindle motor 13. The spindle motor 13 receives, via the relay FPC 65, a drive signal from the servo controller 54 and supply of power from the PCB 50.

Figure 5:
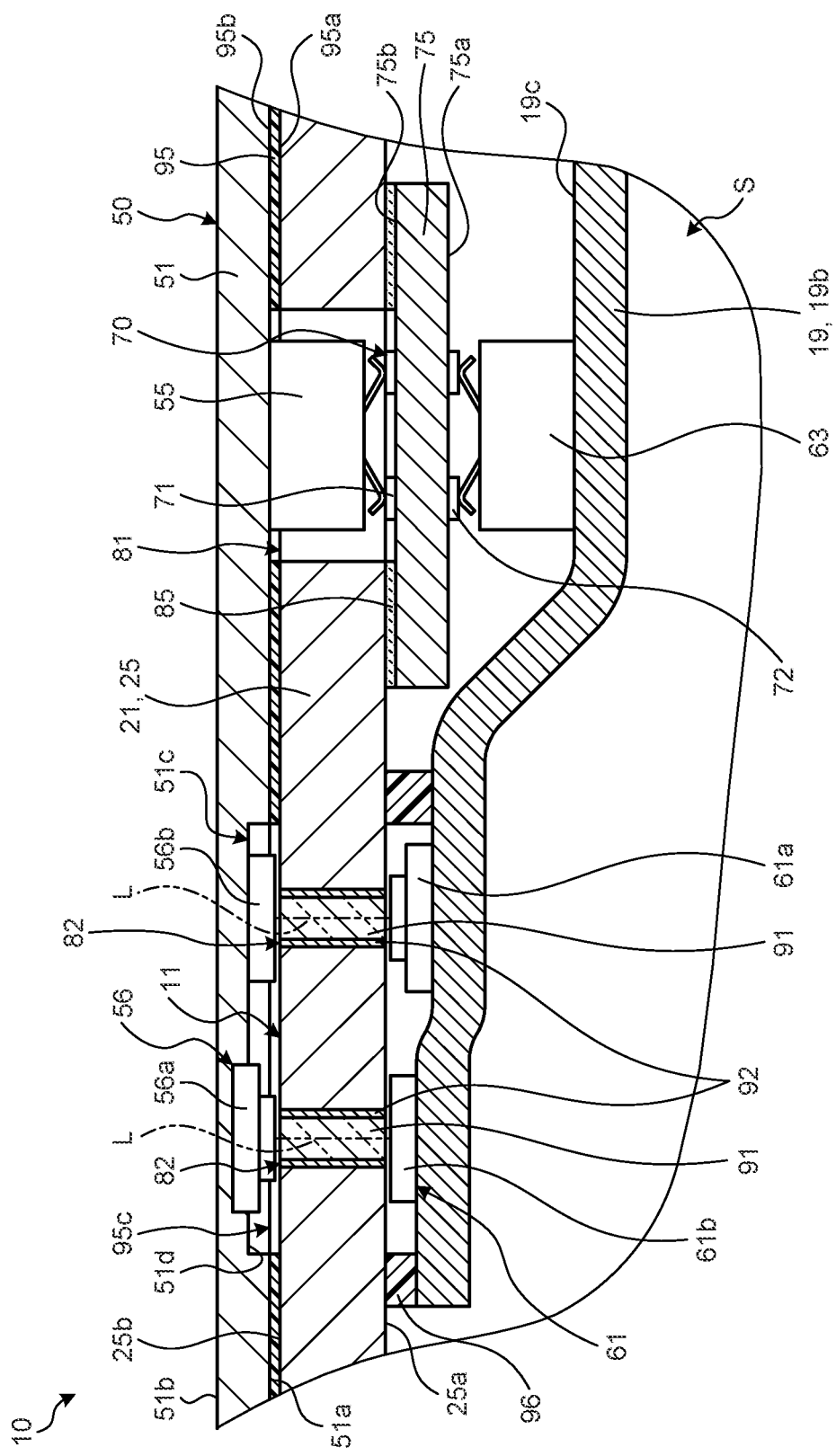
FIG. 5 is an exemplary cross-sectional view schematically illustrating a portion of the HDD according to the first embodiment taken along line F5-F5 of FIG. 3.

Hereinafter, a structure of the HDD 10 according to the present embodiment will be described in detail. FIG. 5 is an exemplary cross-sectional view schematically illustrating a part of the HDD 10 according to the first embodiment taken along line F5-F5 of FIG. 3. As illustrated in FIG. 5, the bottom wall 25 of the base 21 includes an inner surface 25a and an outer surface 25b.

The inner surface 25a faces the inside of the housing 11. The inner surface 25a forms (defines, encloses) part of the internal space S of the housing 11. In other words, the inner surface 25a faces the internal space S. The inner surface 25a faces the various components such as the FPC 19 arranged in the internal space S.

The outer surface 25b is opposite the inner surface 25a and faces outward from the housing 11. The outer surface 25b faces the PCB 50 with spacing. Note that the outer surface 25b and the PCB 50 may be in contact with each other.

The bottom wall 25 is provided with an insertion hole 81 and a plurality of through-holes 82. The insertion hole 81 is an example of a second through-hole. Each of the through-holes 82 is an example of a first through-hole. The insertion hole 81 and the through-holes 82 penetrate the bottom wall 25 and open to the inner surface 25a and the outer surface 25b. In other words, the insertion hole 81 and the through-holes 82 allow the internal space S to be in communication with the outside of the housing 11.

The insertion hole 81 has an opening area (cross-sectional area) larger than each through-hole 82. The insertion hole 81 is, for example, a substantially quadrangular hole. The through-hole 82 is, for example, a substantially circular hole. Note that the opening areas and shapes of the insertion hole 81 and the through-hole 82 are not limited to this example.

The relay board 75 is, for example, a substantially quadrangular plate formed of an insulating material such as synthetic resin or ceramics. Note that the relay board 75 is not limited to this example. The relay board 75 includes an inner surface 75a and an outer surface 75b.

The inner surface 75a is a substantially flat surface facing the inside of the housing 11. The inner surface 75a forms (defines, encloses) part of the internal space S of the housing 11. The inner surface 75a faces the components such as the FPC 19 arranged in the internal space S.

The outer surface 75b is a substantially flat surface opposite the inner surface 75a and faces outward from the housing 11. The outer surface 75b has an area larger than the opening area of the insertion hole 81. The outer surface 75b covers the insertion hole 81 from the inside of the housing 11. Part of the outer surface 75b faces the inner surface 25a of the bottom wall 25. Another part of the outer surface 75b is exposed to the outside of the housing 11 through the insertion hole 81 and faces an inner surface 51a of the PWB 51 through the insertion hole 81.

For example, an adhesive 85 is applied to the gap between the inner surface 25a of the bottom wall 25 and the outer surface 75b of the relay board 75 facing each other. The adhesive 85 works to fix the inner surface 25a of the bottom wall 25 and the outer surface 75b of the relay board 75 together. For example, the adhesive 85 contains a metal filler to be able to restrict passage of a gas through the adhesive 85.

The adhesive 85 is spread along the edge of the insertion hole 81 to close the gap between the inner surface 25a of the bottom wall 25 and the outer surface 75b of the relay board 75 entirely. Thus, the relay board 75 hermetically closes the insertion hole 81. Note that the relay board 75 may be fixed to the bottom wall 25 by other means such as solder.

Each of the relay connectors 71 and 72 includes, for example, a plurality of pins (terminals). The number of pins and the size of each of the relay connectors 71 and 72 are set according to, for example, the amount of power and the amount of data transmitted via the wired connection 70.

In the present embodiment, the wired connection 70 is used for supplying power and not for transmitting the read signal and the write signal corresponding to data. This can reduce the number of pins and the size of each of the relay connectors 71 and 72. Note that the wired connection 70 may be used for data transmission.

The pins (terminals) of the relay connector 71 are provided, for example, on the outer surface 75b of the relay board 75. Note that the relay connector 71 may include, for example, a plug or a receptacle protruding from the outer surface 75b.

The pins (terminals) of the relay connector 72 are provided on the inner surface 75a of the relay board 75. As described above, the wired connection 70 extends on the relay board 75. Note that the relay connector 72 may include, for example, a plug or a receptacle protruding from the inner surface 75a.

In the relay board 75, the relay connector 71 provided on the outer surface 75b and the relay connector 72 provided on the inner surface 75a are electrically connected, for example, through conductors such as vias penetrating the relay board 75. That is, the relay connector 71 and the relay connector 72 are electrically connected to each other. The conductors electrically connect the relay connector 71 and the relay connector 72 while the insertion hole 81 is maintained in the sealed state by the relay board 75.

The FPC 19 includes, for example, a lamination of a conductor layer, an insulating layer, and an adhesive layer, and is elastically deformable. The conductor layer is formed of a conductive metal such as copper. The insulating layer is formed of an insulating synthetic resin such as polyimide.

As illustrated in FIG. 2, the FPC 19 includes a first end 19a and a second end 19b. The first end 19a is attached to the actuator block 35 with, for example, screws. The first end 19a is electrically connected to the flexure 43. The second end 19b is attached to the bottom wall 25 with, for example, screws.

As illustrated in FIG. 5, the second end 19b of the FPC 19 extends substantially along the inner surface 25a of the bottom wall 25. The second end 19b includes an outer surface 19c. The outer surface 19c faces the inner surface 25a of the bottom wall 25 and the inner surface 75a of the relay board 75. Note that the outer surface 19c may partially contact with the inner surface 25a of the bottom wall 25.

The PWB 51 includes the inner surface 51a and an outer surface 51b. The inner surface 51a is an example of a first surface. The outer surface 51b is an example of a second surface. The inner surface 51a faces the outer surface 25b of the bottom wall 25 and the outer surface 75b of the relay board 75 with spacing. The inner surface 51a covers the insertion hole 81 and the plurality of through-holes 82. The outer surface 51b is opposite the inner surface 51a.

The PWB 51 is provided with a recess 51c recessed from the inner surface 51a. The recess 51c is located, for example, in a part of the inner surface 51a facing the through-holes 82. Note that the recess 51c is not limited to this example.

The relay connector 55 of the PWB 51 and the relay connector 63 of the FPC 19 have structures corresponding to the relay connectors 71 and 72 of the wired connection 70, respectively. Each of the relay connectors 55 and 63 includes, for example, an insulating base and the plurality of pins (terminals) attached to the base.

For example, one end of each pin of the relay connector 55 is soldered to an electrode provided on the inner surface 51a of the PWB 51. Thereby, the relay connector 55 is attached to the PWB 51. In this manner, the relay connector 55 is included in the PWB 51, protruding from the inner surface 51a. The relay connector 55 is connected to the relay connector 71 of the wired connection 70. The relay connector 71 is thus connected to the PWB 51.

For example, one end of each pin of the relay connector 63 is soldered to an electrode provided on the outer surface 19c of the FPC 19. Thereby, the relay connector 63 is attached to the FPC 19. In this manner, the relay connector 63 is included in the FPC 19, protruding from the outer surface 19c. The relay connector 63 is connected to the relay connector 72 of the wired connection 70. The relay connector 72 is thus connected to the FPC 19.

The FPC 19 and the PWB 51 are electrically connected to each other by the wired connection 70 while the insertion hole 81 is maintained in the sealed state by the relay board 75. However, for example, the relay board 75 formed of a synthetic resin may have fine holes. For example, it is preferable for the relay board 75 to hermetically close the insertion hole 81 to such an extent that a leakage of the gas from the internal space S falls within a given range during the service life of the HDD 10.

The housing 11 further includes a plurality of sealing materials 91. Each of the sealing materials 91 is an example of a first sealing material. The sealing material 91 is formed of, for example, transparent or translucent glass or synthetic resin. Thus, the sealing material 91 allows transmission of light.

The sealing materials 91 hermetically seal the corresponding through-holes 82. For example, the sealing material 91 is formed by being filled into a substantially cylindrical metal tube 92. The metal tube 92 containing the sealing material 91 is welded to the bottom wall 25 while being fitted into the corresponding through-hole 82. Thereby, the sealing material 91 can seal the through-hole 82. Note that the sealing material 91 is not limited to this example. For example, the sealing material 91 may be directly filled into the through-hole 82, or an adhesive may seal between the sealing material 91 and the through-hole 82.

Instead of the sealing materials 91 according to the present embodiment, the sealing materials 91 of a lid form may be attached to the inner surface 25a and outer surface 25b of the bottom wall 25 to hermetically seal the through-holes 82. In other words, the sealing materials 91 may be located outside the through-holes 82.

Figure 6:
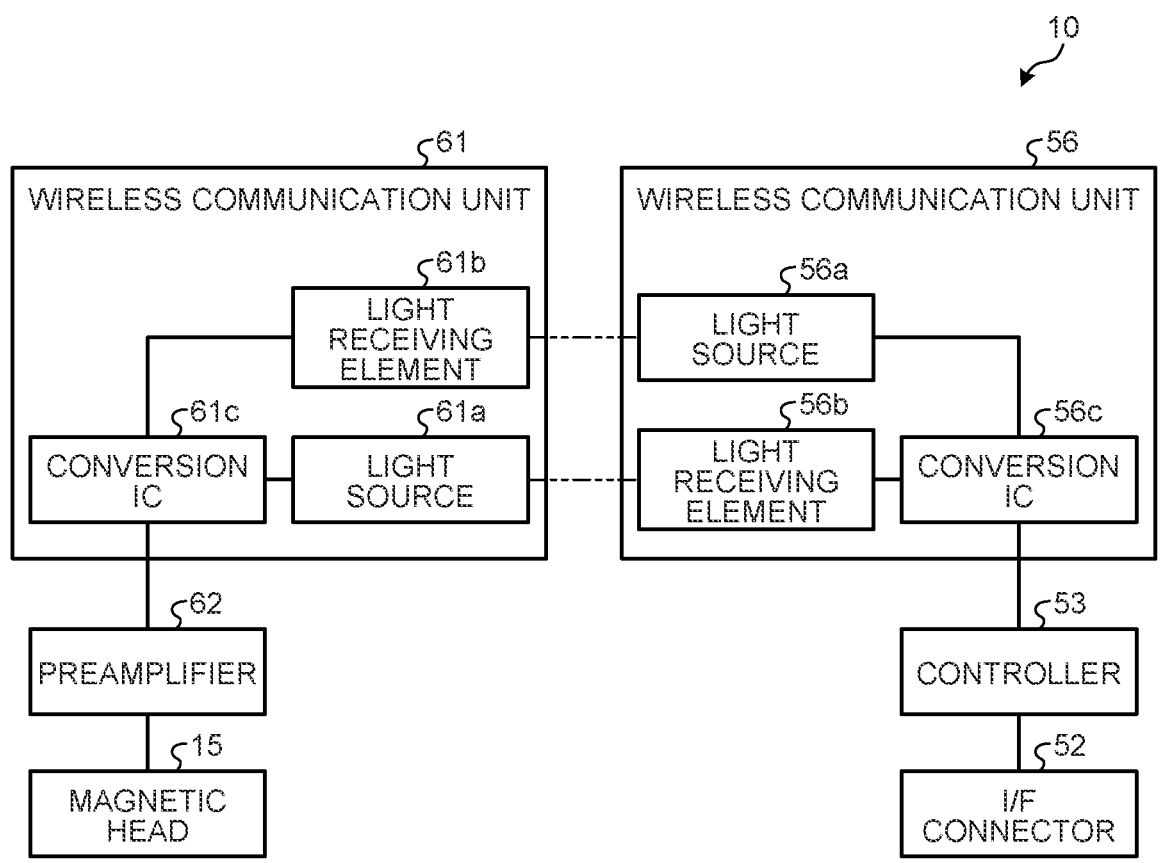
FIG. 6 is an exemplary block diagram illustrating a configuration of a portion of the HDD according to the first embodiment.

FIG. 6 is an exemplary block diagram illustrating a configuration of a portion of the HDD 10 according to the first embodiment. As illustrated in FIG. 6, in the present embodiment, the wireless communication unit 56 of the PWB 51 includes, for example, a light source 56a, a light receiving element 56b, and a conversion IC 56c. The light source 56a and the light receiving element 56b are an example of the external wireless communication device. Furthermore, the wireless communication unit 56 may be an example of the external wireless communication device. Furthermore, the conversion IC 56c may be an example of the external component.

The light source 56a, the light receiving element 56b, and the conversion IC 56c are separately mounted on the PWB 51. Note that the light source 56a, the light receiving element 56b, and the conversion IC 56c may be integrated.

As illustrated in FIG. 5, the light source 56a and light receiving element 56b of the wireless communication unit 56 are mounted in the recess 51c of the PWB 51 outside the housing 11. In other words, the light source 56a and the light receiving element 56b are at least partially housed in the recess 51c.

The light source 56a is, for example, a laser diode (LD). Note that the light source 56a may be another light source such as a light emitting diode (LED). For example, the light source 56a is partially embedded in the PWB 51. In other words, the light source 56a is integrated with the PWB 51. Note that the light source 56a is not limited to this example. The light source 56a emits a laser beam (light) L corresponding to the input drive signal (electric signal), to the sealing material 91 of one corresponding through-hole 82. The light source 56a may be in contact with the sealing material 91 or may be separated from the sealing material 91.

The light receiving element 56b is, for example, a photodiode or a phototransistor. Note that the light receiving element 56b is not limited to this example. The light receiving element 56b is mounted, for example, on a bottom surface 51d of the recess 51c. The bottom surface 51d is part of the PWB 51, forms (defines, encloses) part of the recess 51c, and faces the outer surface 25b of the bottom wall 25 with spacing. The light receiving element 56b has a light receiving surface that faces the sealing material 91 of another one of the corresponding through-holes 82. The light receiving element 56b may be in contact with the sealing material 91 or may be separated from the sealing material

91. The light receiving element 56*b* outputs an output signal (electric signal) corresponding to the light L incident on the light receiving surface.

The conversion IC 56*c* outputs the drive signal (electric signal) corresponding to the write signal (electric signal) input from the controller 53, to the light source 56*a*. Furthermore, the conversion IC 56*c* outputs the read signal (electric signal) corresponding to the output signal (electric signal) of the light receiving element 56*b*, to the controller 53. The conversion IC 56*c* may perform multiplexing.

Each of the light source 56*a* and the light receiving element 56*b* may include the conversion IC 56*c*. In this configuration, the light source 56*a* receives the write signal as the drive signal, and the light receiving element 56*b* outputs the output signal as the read signal.

As described above, the wireless communication unit 56 converts the light L (optical signal) into the electric signal and converts the electric signal into the optical signal. Thereby, the wireless communication unit 56 can perform wireless communications by using the optical signal without using electrical connection. Note that the wireless communication unit 56 is not limited to this example.

As illustrated in FIG. 6, in the present embodiment, the wireless communication unit 61 includes, for example, a light source 61*a*, a light receiving element 61*b*, and a conversion IC 61*c*. The light source 61*a* and the light receiving element 61*b* are an example of the internal wireless communication device. The wireless communication unit 61 may be an example of the internal wireless communication device. The conversion IC 61*c* may be an example of the internal component.

The light source 61*a*, the light receiving element 61*b*, and the conversion IC 61*c* are separately mounted on the outer surface 19*c* of the FPC 19. In other words, the light source 61*a*, the light receiving element 61*b*, and the conversion IC 61*c* are electrically connected to the FPC 19. Note that the light source 61*a*, the light receiving element 61*b*, and the conversion IC 61*c* may be integrated.

As illustrated in FIG. 5, the light source 61*a* is, for example, an LD. Note that the light source 61*a* may be another light source such as an LED. The light source 61*a* emits a laser beam (light) L corresponding to the input drive signal (electric signal), to the sealing material 91 of one corresponding through-hole 82. The light source 61*a* may be in contact with the sealing material 91 or may be separated from the sealing material 91.

The light source 61*a* of the wireless communication unit 61 and the light receiving element 56*b* of the wireless communication unit 56 face each other via the sealing material 91 in the corresponding through-hole 82. The light source 61*a* emits the light L to the light receiving surface of the light receiving element 56*b* of the wireless communication unit 56 through, for example, the sealing material 91 in the corresponding through-hole 82.

The light source 61*a* and the light receiving element 56*b* may not face each other. For example, the light receiving element 56*b* may be separated from the optical axis of the light source 61*a*. In this configuration, the light L emitted from the light source 61*a* can be reflected, refracted, or diffracted to be incident on the light receiving element 56*b*, for example.

The light receiving element 61*b* is, for example, a photodiode or a phototransistor. Note that the light receiving element 61*b* is not limited to this example. The light receiving element 61*b* has a light receiving surface that faces the sealing material 91 in another one of corresponding through-holes 82. The light receiving element 61*b* may be in contact with the sealing material 91 or may be separated from the sealing material 91.

The light receiving element 61*b* of the wireless communication unit 61 and the light source 56*a* of the wireless communication unit 56 face each other via the sealing material 91 in the corresponding through-hole 82. The light receiving element 61*b* outputs, for example, an output signal (electric signal) corresponding to the light L emitted from the light source 56*a* and incident on the light receiving surface through the sealing material 91 in the corresponding through-hole 82.

The light source 56*a* and the light receiving element 61*b* may not face each other. For example, the light receiving element 61*b* may be separated from the optical axis of the light source 56*a*. In this configuration, the light L emitted from the light source 56*a* can be reflected, refracted, or diffracted to be incident on the light receiving element 61*b*, for example.

In the present embodiment, the total number of the light sources 56*a* and the light receiving element 56*b* included in the wireless communication unit 56, the total number of the light sources 61*a* and the light receiving element 61*b* included in the wireless communication unit 61, and the number of the through-holes 82 are equal to one another. However, the numbers of the light sources 56*a* and 61*a*, the light receiving elements 56*b* and 61*b*, and the through-holes 82 are not limited to this example. For example, a plurality of light sources 56*a* and 61*a* and a plurality of light receiving elements 56*b* and 61*b* may face each other through one through-hole 82.

The conversion IC 61*c* illustrated in FIG. 6 outputs the drive signal (electric signal) corresponding to the read signal (electric signal) input from the preamplifier 62, to the light source 61*a*. Furthermore, the conversion IC 61*c* outputs the write signal (electric signal) corresponding to the output signal (electric signal) of the light receiving element 61*b*, to the preamplifier 62. The conversion IC 56*c* may perform multiplexing.

Each of the light source 61*a* and the light receiving element 61*b* may include the conversion IC 61*c*. In this configuration, the light source 61*a* receives the read signal as the drive signal, and the light receiving element 61*b* outputs the output signal as the write signal.

As described above, the wireless communication unit 61 converts the optical signal into the electric signal and converts the electric signal into the optical signal. Thereby, the wireless communication unit 61 perform wireless communications by using the optical signal without using electrical connection. For example, the conversion IC 56*c* of the wireless communication unit 56 and the conversion IC 61*c* of the wireless communication unit 61 wirelessly communicate with each other via the light sources 56*a* and 61*a* and the light receiving elements 56*b* and 61*b*. Note that the wireless communication unit 61 is not limited to this example.

The wireless communication units 56 and 61 according to the present embodiment wirelessly communicate with each other using the light L. For example, the conversion ICs 56*c* and 61*c* of the wireless communication units 56 and 61 convert and generate the signals by a common communication method. Furthermore, the light sources 56*a* and 61*a* of the wireless communication units 56 and 61 emit the light L having a frequency detectable by the light receiving elements 56*b* and 61*b*. Note that the light L is not limited to visible light and may be infrared light or ultraviolet light.

As illustrated in FIG. 5, the HDD 10 further includes a first light shielding sheet 95 and a second light shielding sheet 96. The first light shielding sheet 95 is an example of a light shielding member. The first light shielding sheet 95 is, for example, a polymer sheet such as a heat transfer sheet or a heat dissipation sheet. Note that the first light shielding sheet 95 is not limited to this example.

The first light shielding sheet 95 is located between the PWB 51 and the bottom wall 25 of the housing 11. The first light shielding sheet 95 includes an inner surface 95a and an outer surface 95b. The inner surface 95a and the outer surface 95b are adhesive surfaces of the first light shielding sheet 95.

The inner surface 95a faces the outer surface 25b of the bottom wall 25 and is removably adhered to the outer surface 25b. The outer surface 95b is opposite the inner surface 95a. The outer surface 95b faces the PCB 50 and is removably adhered to the PCB 50. The outer surface 95b is attached, for example, to the inner surface 51a of the PWB 51. The outer surface 95b may be adhered to various components included in the PCB 50 or mounted on the PWB 51.

The first light shielding sheet 95 is elastically deformable in conformity with the shapes of the outer surface 25b of the bottom wall 25 and the inner surface 51a of the PWB 51. Thereby, the first light shielding sheet 95 can prevent occurrence of a gap between the inner surface 95a and the outer surface 25b irrespective of an unevenness in the outer surface 25b of the bottom wall 25. Likewise, the first light shielding sheet 95 can prevent occurrence of a gap between the outer surface 95b and the inner surface 51a irrespective of an unevenness in the inner surface 51a of the PWB 51.

The first light shielding sheet 95 is provided with a through-hole 95c. The through-hole 95c penetrates the first light shielding sheet 95 and opens to the inner surface 95a and the outer surface 95b. The through-hole 95c are in communication with the through-holes 82 in the bottom wall 25 and the recess 51c in the PWB 51.

The light source 56a and the light receiving element 56b of the wireless communication unit 56 are located inside the through-hole 95c. In other words, in a direction along the outer surface 25b of the bottom wall 25, the first light shielding sheet 95 surrounds the light source 56a and the light receiving element 56b of the wireless communication unit 56.

The first light shielding sheet 95 is not transparent but is black, white, or another in color, or translucent. The first light shielding sheet 95 blocks light in the gap between the bottom wall 25 and the PCB 50. Thus, the first light shielding sheet 95 functions to shield the light receiving element 56b of the wireless communication unit 56 from incidence of light from outside the housing 11, and shield the light receiving element 61b of the wireless communication unit 61 from incidence of light from outside the housing 11 through the sealing materials 91 in the through-holes 82.

For example, the first light shielding sheet 95 excels in thermal conductivity than the PWB 51. Because of this, the first light shielding sheet 95 can transfer heat between the PCB 50 and the base 21 of the housing 11. For example, the first light shielding sheet 95 is attached to the controller 53 of the PCB 50 to cool the controller 53.

In the present embodiment, the outer surface 95b of the first light shielding sheet 95 has substantially the same size as the inner surface 51a of the PWB 51. Note that the first light shielding sheet 95 is not limited to this example. For example, the first light shielding sheet 95 may be in the form of a frame extending along the periphery of the recess 51c in the PWB 51.

The second light shielding sheet 96 is located between the inner surface 25a of the bottom wall 25 and the outer surface 19c of the FPC 19. The second light shielding sheet 96 is adhesive and is removably adhered to the inner surface 25a and the outer surface 19c.

The second light shielding sheet 96 has, for example, a frame shape to surround the light source 61a and the light receiving element 61b of the wireless communication unit 61. The second light shielding sheet 96 is not transparent but is black, white, or another in color or translucent. The second light shielding sheet 96 blocks light in the gap between the bottom wall 25 and the FPC 19. Thus, the second light shielding sheet 96 functions to shield the light receiving element 61b of the wireless communication unit 61 from incidence of light from the internal space S, and shield the light receiving element 56b of the wireless communication unit 56 from incidence of light from the internal space S through the sealing materials 91 of the through-holes 82.

Hereinafter, an example of the operation of the HDD 10 according to the present embodiment will be described. For example, in a write operation, the processor 1b of the electronic device 1 of FIG. 4 inputs the write command and data to be written to the controller 53, via the I/F connectors 1a and 52. The RWC of the controller 53 inputs the write signal corresponding to the data to be written to the conversion IC 56c of the wireless communication unit 56 in accordance with the write command.

The conversion IC 56c of FIG. 6 converts the input write signal into the drive signal and outputs the drive signal to the light source 56a. The light source 56a emits the laser beam (light) L corresponding to the drive signal to the light receiving element 61b of the wireless communication unit 61 through the sealing material 91 in the through-hole 82. In other words, the light source 56a of the wireless communication unit 56 generates and emits the light L corresponding to the electric signal (write signal) representing information to be written to each magnetic disk 12 by each magnetic head 15, to the light receiving element 61b of the wireless communication unit 61. The light source 56a emits the light L to the light receiving element 61b through the sealing material 91 in the through-hole 82.

In response to incidence of the light L, the light receiving element 61b of the wireless communication unit 61 outputs the output signal corresponding to the light L to the conversion IC 61c. The conversion IC 61c converts or restores the output signal to the write signal and outputs the write signal to the preamplifier 62. In this manner, the light receiving element 61b of the wireless communication unit 61 is irradiated with the light L from the light source 56a of the wireless communication unit 56 through the sealing material 91 in the through-hole 82. The light receiving element 61b generates, corresponding to the light L, the electric signal (write signal) representing information to be written to each magnetic disk 12 by each magnetic head 15.

The preamplifier 62 amplifies the write signal and outputs the write signal to each magnetic head 15. The magnetic head 15 writes intended data included in the write signal to the recording layer of the magnetic disk 12.

Furthermore, the controller 53 of FIG. 4 controls various components such as the VCM 17 in accordance with the write command. For example, under the control of the controller 53, the servo controller 54 controls the VCM 17. The servo controller 54 outputs a signal to the VCM 17 through the relay connectors 55, 72, 71, and 63. The servo controller 54 may output the signal to the VCM 17 via the wireless communication units 56 and 61.

In a read operation, the processor 1b of the electronic device 1 inputs the read command to the controller 53 via the I/F connectors 1a and 52. The controller 53 controls each magnetic head 15 to read data from the recording layer of the corresponding magnetic disk 12 following the read command.

Each magnetic head 15 reads intended data, and the preamplifier 62 amplifies the read signal corresponding to the read data, and outputs the amplified read signal to the conversion IC 61c of the wireless communication unit 61. The conversion IC 61c of FIG. 6 converts the input read signal into the drive signal and outputs the drive signal to the light source 61a. The light source 61a emits the laser beam (light) L corresponding to the drive signal to the light receiving element 56b of the wireless communication unit 56, through the sealing material 91 of the through-hole 82. In other words, the light source 61a of the wireless communication unit 61 generates and emits the light L corresponding to the electric signal (read signal) representing information read from each magnetic disk 12 by each magnetic head 15, to the light receiving element 56b of the wireless communication unit 56. The light source 61a emits the light L to the light receiving element 56b through the sealing material 91 in the through-hole 82.

In response to incidence of the light L, the light receiving element 56b of the wireless communication unit 56 outputs the output signal corresponding to the light L, to the conversion IC 56c. The conversion IC 56c converts or restores the output signal into the read signal and outputs the read signal to the controller 53. In this manner, the light receiving element 56b of the wireless communication unit 56 is irradiated with the light L from the light source 61a of the wireless communication unit 61 through the sealing material 91 in the through-hole 82. The light receiving element 56b generates, corresponding to the light L, the electric signal (read signal) representing information read from each magnetic disk 12 by each magnetic head 15.

The RWC of the controller 53 demodulates the read signal and outputs intended data included in the read signal to the electronic device 1 through the I/F connectors 1a and 52. Thereby, the electronic device 1 acquires the data read from each magnetic disk 12.

In the operation of the HDD 10 described above, the FPC 19 inside the housing 11 and the PCB 50 outside the housing 11 mutually transmit and receive data through the wireless communications between the wireless communication units 56 and 61 using the light L. Meanwhile, the magnetic heads 15, VCM 17, and FPC 19 inside the housing 11 are supplied with power through the relay connectors 55, 63, 71, and 72. Thus, the relay connectors 55, 63, 71, and 72 are provided with the pins for supply of power but pins for data transmission and reception are omissible.

The relay connectors 55, 63, 71, and 72 may be provided with pins for data transmission and reception. In this configuration the FPC 19 and the PWB 51 can transmit and receive data partially through the wireless communications between the wireless communication units 56 and 61 and partially through the wired communications through the relay connectors 55, 63, 71, and 72. For example, a small amount of data can be transmitted and received through the wired communications via the relay connectors 55, 63, 71, and 72.

In the electronic device 1 according to the first embodiment described above, the light source 61a and the light receiving element 61b are housed in the internal space S.

The light source 61a and the light receiving element 61b generate at least one of: the electric signal (write signal) representing information to be written to each magnetic disk 12 by each magnetic head 15, corresponding to the light L generated by the light source 56a; and the light L corresponding to the electric signal (read signal) representing information read from each magnetic disk 12 by each magnetic head 15, and emits the light L to the light receiving element 56b. The preamplifier 62 is housed in the internal space S, is electrically connected to the magnetic heads 15, and communicates with the PCB 50 outside the housing 11 through the light sources 56a and 61a and the light receiving elements 56b and 61b. Conventionally, for example, the relay connectors 71 and 72 provided on the relay board 75 may transmit and receive the write signal and the read signal between the preamplifier 62 and the PCB 50. This may however cause an increase in size of the relay board 75 and the relay connectors 71 and 72 along with an increase in capacity of the write signal and the read signal. A larger-size relay board 75 may result in a leakage of the gas from the internal space S through fine holes in the relay board 75 or the adhesive 85 lying between the housing 11 and the relay board 75, a decrease in positioning accuracy between the relay connectors 71 and 72 and the relay connectors 55 and 63, and an increase in design cost for designing new, larger relay board 75 and relay connectors 71 and 72. To the contrary, the HDD 10 according to the present embodiment communicates the write signal and the read signal between the preamplifier 62 and the PCB 50 using the light L. In other words, the HDD 10 can perform communications between the inside and outside of the housing 11 without the relay connectors 71 and 72. Thus, the HDD 10 can exclude, for example, pins (terminals) for communicating the write signal and the read signal from the relay connectors 71 and 72. Thus, the HDD 10 enables, for example, downsizing or omission of the relay board 75 and the relay connectors 71 and 72 and can prevent a leakage of the gas from the internal space S. Furthermore, the HDD 10 can prevent a decrease in positioning accuracy between the components and an increase in design cost.

The light source 56a and the light receiving element 56b are located outside the housing 11, and generate at least one of: the electric signal (read signal) corresponding to the light L generated by the light source 61a; and the light L corresponding to the electric signal (write signal) representing information to be written to each magnetic disk 12 by each magnetic head 15, and emits the light L to the light receiving element 61b. The PCB 50 includes the PWB 51. The PWB 51 is attached to the outside of the housing 11, and the light source 56a and the light receiving element 56b are mounted on the PWB 51. In other words, the light source 61a and the light receiving element 61b do not communicate with an external device other than the HDD 10. Instead, the light source 61a and the light receiving element 61b are attached to the housing 11 to communicate with the light source 56a and the light receiving element 56b included in the HDD 10. This eliminates the necessity for the electronic device 1 incorporating the HDD 10 to include the light source 56a and the light receiving element 56b, for example. The HDD 10 can be included in the electronic device 1 as with a general HDD.

The housing 11 includes the bottom wall 25 covering the internal space S. The PWB 51 includes the inner surface 51a facing the bottom wall 25 and is provided with the recess 51c recessed from the inner surface 51a. The light source 56a and the light receiving element 56b are mounted in the recess 51c of the PWB 51. Thereby, the light source 56a and the light receiving element 56b are surrounded by the part surrounding the recess 51c in the PWB 51, to be able to prevent the light receiving element 56b from receiving optical noise from the outside of the HDD 10.

The housing 11 includes the bottom wall 25 covering the internal space S, and is provided with the through-holes 82 penetrating the bottom wall 25. The light source 61a and the light receiving element 61b generate the electric signal corresponding to the light L emitted from the light source 56a through the through-hole 82, and/or emit the light L to the light receiving element 56b through the through-hole 82. In this way, the light sources 56a and 61a and the light receiving elements 56b and 61b communicate the write signal and the read signal between the inside and outside of the housing 11 using the light L. This makes it possible for the HDD 10 to exclude, for example, the pins (terminals) for communicating the write signal and the read signal from the relay connectors 71 and 72. Thereby, the HDD 10 can prevent, for example, a leakage of gas from the internal space S. Furthermore, the HDD 10 can prevent a decrease in positioning accuracy between the components and an increase in design cost. In addition, the optical communications generally excels in transfer rate than the electrical communications. Thus, the wireless communication units 56 and 61 reduce the number of the light sources 56a and 61a and the through-holes 82, leading to preventing a leakage of gas from the internal space S through the through-holes 82.

The first light shielding sheet 95 is located between the PWB 51 and the housing 11 to surround the light source 56a and the light receiving element 56b to block light. The first light shielding sheet 95 surrounds the light source 56a and the light receiving element 56b, thereby preventing the light receiving element 56b from receiving optical noise from the outside of the HDD 10.

The housing 11 includes the transparent or translucent sealing materials 91 that seal the through-holes 82. The light source 61a and the light receiving element 61b generate the electric signal corresponding to the light L emitted from the light source 56a through the sealing material 91, and/or emit the light L to the light receiving element 56b through the sealing material 91. Thereby, the HDD 10 according to the present embodiment can prevent a leakage of gas from the internal space S through the through-holes 82.

The wired connection 70 electrically connects the PCB 50 and the preamplifier 62. The housing 11 includes the bottom wall 25 covering the internal space S and provided with the insertion hole 81, and the relay board 75 closing the insertion hole 81. The wired connection 70 includes the relay connector 71 provided on the relay board 75 outside the housing 11 and electrically connected to the PCB 50, and the relay connector 72 provided on the relay board 75 in the internal space S and electrically connected to the relay connector 71. The preamplifier 62 is electrically connected to the relay connector 72 to be supplied with power from the PCB 50 through the relay connector 71 and the relay connector 72. Thereby, the preamplifier 62 can be stably supplied with power through the relay connectors 71 and 72. Meanwhile, the relay connectors 71 and 72 can exclude the pins (terminals) for transmitting the read signal and the write signal. As a result, the relay connectors 71 and 72 and the relay board 75 can be prevented from increasing in size, and the HDD 10 can prevent a leakage of gas from the internal space S.

The following other expression can be also given for the first embodiment. The wireless communication unit 61 is housed in the internal space S. The wireless communication unit 61 performs at least one of generation of the write signal corresponding to the light L generated by the wireless communication unit 56, and generation of the light L corresponding to the read signal toward the wireless communication unit 56. The preamplifier 62 is housed in the internal space S, is electrically connected to the magnetic heads 15, and communicates with the PCB 50 outside the housing 11 through the wireless communication units 56 and 61. Furthermore, the conversion IC 61c is housed in the internal space S, is electrically connected to the magnetic heads 15, and communicates with the conversion IC 56c outside the housing 11 through the light sources 56a and 61a and the light receiving elements 56b and 61b.

Second Embodiment

Hereinafter, a second embodiment will be described with reference to FIG. 7. Note that in the following description of the plurality of embodiments, component elements having functions similar to those of the component elements according to the first embodiment are denoted by the same reference numerals and symbols as those of the component elements descried above, and the description thereof may be omitted. In addition, the plurality of component elements denoted by the same reference numerals and symbols does not necessarily have all the functions and properties in common, and may have different functions and properties according to each embodiment.

Figure 7:
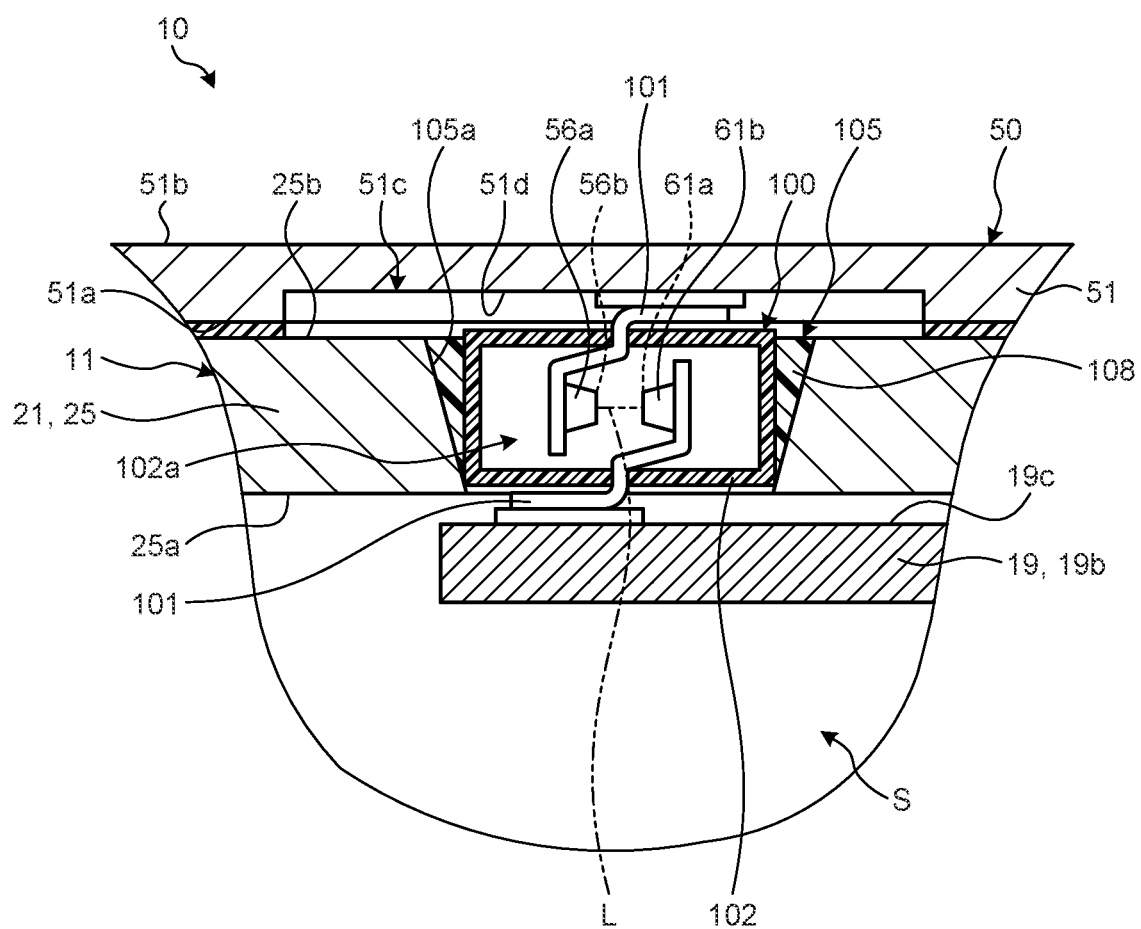
FIG. 7 is an exemplary cross-sectional view schematically illustrating a portion of the HDD according to a second embodiment.

FIG. 7 is an exemplary cross-sectional view schematically illustrating a portion of the HDD 10 according to the second embodiment. As illustrated in FIG. 7, the HDD 10 according to the second embodiment includes a photocoupler 100. The photocoupler 100 is an example of a communication unit.

The photocoupler 100 includes the light sources 56a and 61a, the light receiving elements 56b and 61b, a plurality of conductive members 101, and a casing 102. The light sources 56a and 61a of the photocoupler 100 are, for example, LEDs. Note that the light sources 56a and 61a may be LDs as in the first embodiment.

Each of the conductive members 101 is formed of metal such as copper. The plurality of conductive members 101 is connected to the corresponding light sources 56a and 61a or light receiving elements 56b and 61b. For example, each of the conductive members 101 has one end to which one of the light sources 56a and 61a and the light receiving elements 56b and 61b is connected. Each conductive member 101 has the other end that is a terminal of the photocoupler 100.

The casing 102 is formed of an insulating material such as a synthetic resin. The casing 102 has a box shape and is internally provided with a space 102a. The space 102a is, for example, hermetically sealed.

The light sources 56a and 61a and the light receiving elements 56b and 61b are housed in the space 102a. Therefore, the casing 102 covers the light sources 56a and 61a and the light receiving elements 56b and 61b. The casing 102 is, for example, black in color to block light. Therefore, the casing 102 suppress incidence of external light on the light receiving elements 56b and 61b.

In the space 102a, the light sources 56a and 61a and the light receiving elements 56b and 61b are separated from each other. The light source 56a and the light receiving element 61b face each other with spacing in the space 102a. Furthermore, the light receiving element 56b and the light source 61a face each other with spacing in the space 102a.

In the second embodiment, the conversion IC 56c may be incorporated in the photocoupler 100, may be mounted on the PWB 51, or may be omitted. Furthermore, the conversion IC 61c may be incorporated in the photocoupler 100, may be mounted on the FPC 19, or may be omitted.

Each conductive member 101 is formed integrally with the casing 102 by, for example, insert molding, and is provided over the inside and outside of the casing 102. Therefore, the casing 102 holds the conductive member 101.

The casing 102 holding the conductive members 101 indirectly holds the light sources 56a and 61a and the light receiving elements 56b and 61b. In other words, the casing 102 holds the light sources 56a and 61a and the light receiving elements 56b and 61b at positions separated from each other.

In the second embodiment, the bottom wall 25 is provided with a hole 105 instead of the through-holes 82. The hole 105 is an example of a fourth through-hole. The hole 105 penetrates the bottom wall 25 and opens in the inner surface 25a and the outer surface 25b. In other words, the hole 105 causes the internal space S to communicate with the outside of the housing 11.

At least part of the photocoupler 100 is arranged inside the hole 105. In the present embodiment, the casing 102 of the photocoupler 100 is arranged inside the hole 105. Note that the photocoupler 100 is not limited to this example. For example, the casing 102 may be located outside the hole 105, and the conductive members 101 may penetrate the hole 105.

The hole 105 has a cross-sectional area that extends or tapers, from the inner surface 25a toward the outer surface 25b. Therefore, an inner peripheral surface 105a of the hole 105 is allowed to support the casing 102. Note that the hole 105 is not limited to this example.

The HDD 10 further includes a sealing material 108. The sealing material 108 is filled between the casing 102 and the inner peripheral surface 105a of the hole 105. Therefore, the sealing material 108 hermetically seals a gap between the casing 102 and the inner peripheral surface 105a of the hole 105.

The conductive member 101 connected to the light source 56a and the conductive member 101 connected to the light receiving element 56b are electrically connected to the PWB 51. For example, the conductive members 101 are each connected by soldering to the electrode provided at the PWB 51.

The conductive member 101 connected to the light source 61a and the conductive member 101 connected to the light receiving element 61b are electrically connected to the FPC 19. For example, the conductive members 101 are each connected by soldering to the electrode provided in the FPC 19.

In the second embodiment, the preamplifier 62 in the internal space S and the controller 53 of the PCB 50 outside the housing 11 perform wireless communication through the light sources 56a and 61a and the light receiving elements 56b and 61b, as in the first embodiment. The FPC 19 in the internal space S and the PCB 50 outside the housing 11 are electrically connected to one photocoupler 100. However, inside the photocoupler 100, the light source 56a and light receiving element 56b of the wireless communication unit 56 are separated from the light source 61a and light receiving element 61b of the wireless communication unit 61, and perform communication not using the electric signal but using the optical signal.

In the electronic device 1 according to the second embodiment described above, the photocoupler 100 includes the light source 61a and the light receiving element 61b, the light source 56a and the light receiving element 56b, and the casing 102. The casing 102 holds the light sources 56a and 61a and the light receiving elements 56b and 61b apart from each other, to cover the light sources 56a and 61a and the light receiving elements 56b and 61b. The housing 11 includes the bottom wall 25 covering the internal space S, and is provided with the hole 105 penetrating the bottom wall 25. The photocoupler 100 is at least partly placed in the hole 105. Thereby, the preamplifier 62 and the PCB 50 can communicate with each other through the photocoupler 100. Furthermore, the casing 102 covers the light source 61a and the light receiving element 61b, and the light source 56a and the light receiving element 56b, to be able to prevent entry of noise into communications between the light source 61a and the light receiving element 61b, and the light source 56a and the light receiving element 56b.

The preamplifier 62 and the PCB 50 communicate with each other through the photocoupler 100. The photocoupler 100 is a general element. Thus, the HDD 10 can avoid cost increases.

Third Embodiment

Figure 8:
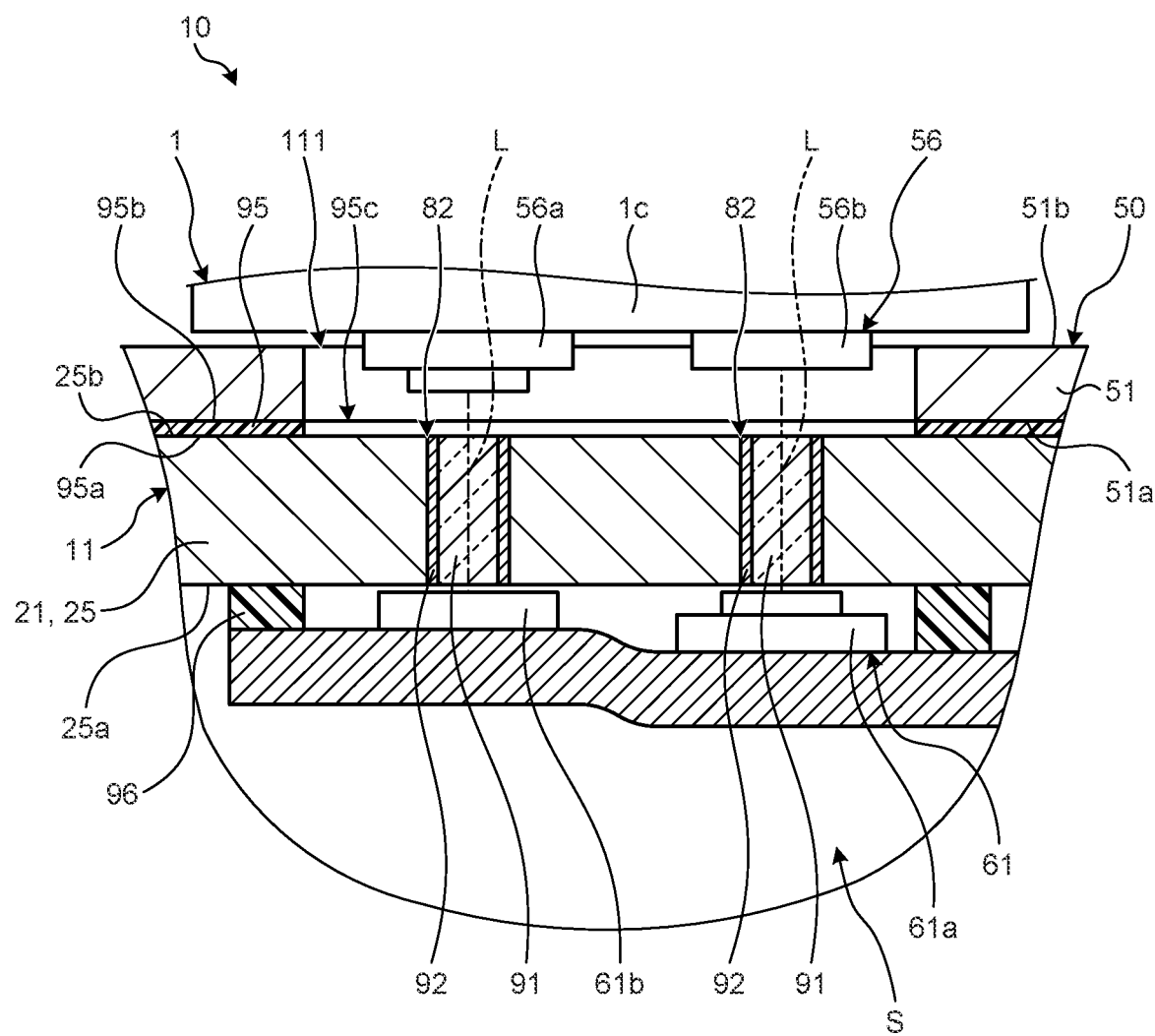
FIG. 8 is an exemplary cross-sectional view schematically illustrating a portion of the HDD according to a third embodiment.
Figure 9:
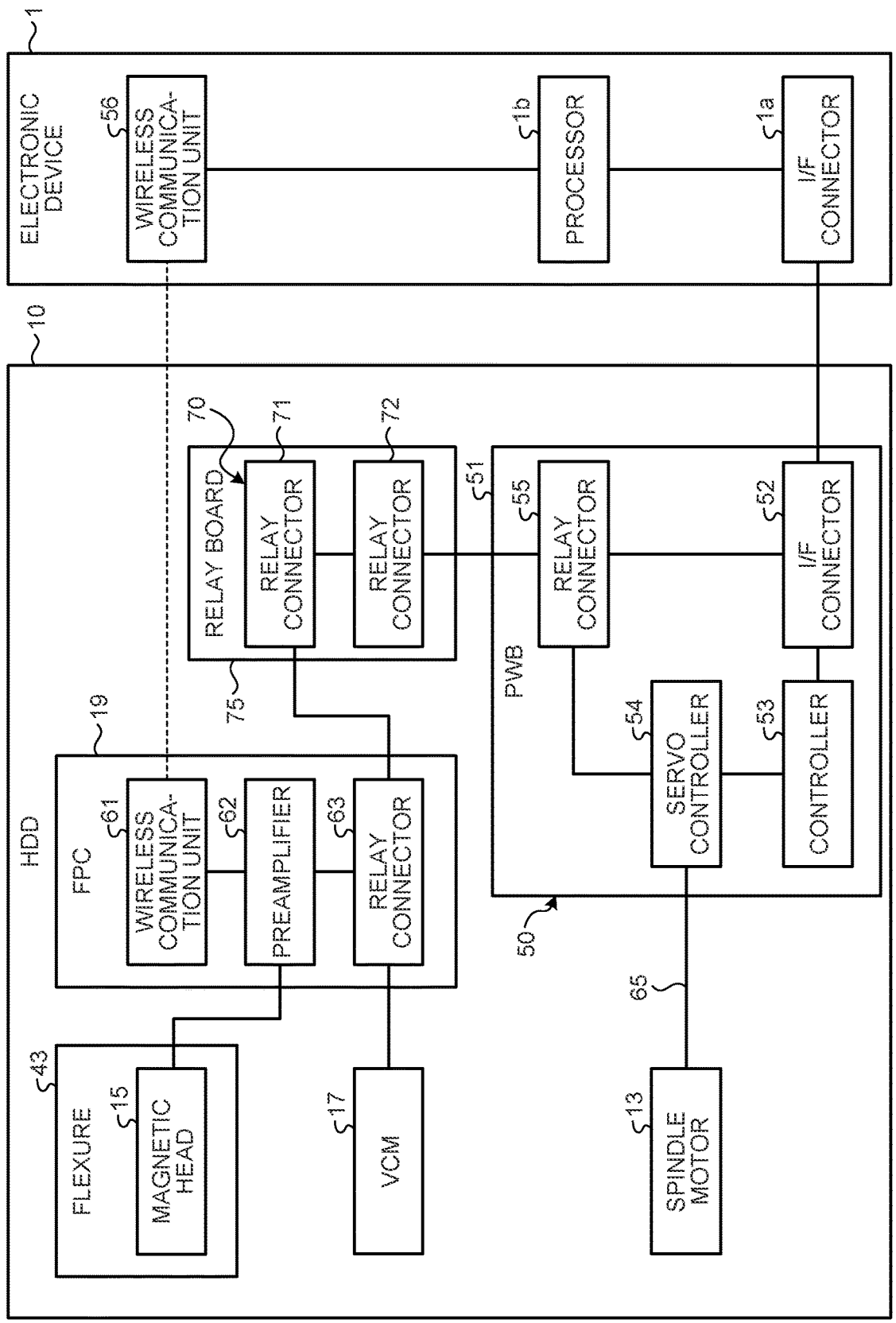
FIG. 9 is an exemplary block diagram illustrating a configuration of the HDD according to the third embodiment.

Hereinafter, a third embodiment will be described with reference to FIGS. 8 and 9. FIG. 8 is an exemplary cross-sectional view schematically illustrating a portion of the HDD 10 according to the third embodiment. FIG. 9 is an exemplary block diagram illustrating a configuration of the HDD 10 according to the third embodiment. As illustrated in FIG. 9, in the third embodiment, the wireless communication unit 56 is mounted not on the PWB 51 but on the electronic device 1.

The electronic device 1 according to the third embodiment includes the HDD 10, and further the wireless communication unit 56, the I/F connector 1a, and the processor 1b that are separated from the HDD 10. Therefore, the electronic device 1 includes the light source 56a, the light receiving element 56b, and the conversion IC 56c. The processor 1b is an example of the external component in the third embodiment.

As illustrated in FIG. 8, the PWB 51 according to the third embodiment is provided with an opening 111 instead of the recess 51c. The opening 111 is an example of a fifth through-hole. The opening 111 penetrates the PWB 51 and opens in the inner surface 51a and the outer surface 51b of the PWB 51.

In a direction along the outer surface 25b of the bottom wall 25, the plurality of through-holes 82 is located inside the opening 111 in plan view. Therefore, the opening 111 exposes part of the outer surface 25b, the plurality of through-holes 82 opened in the outer surface 25b, and the plurality of sealing materials 91. In the third embodiment, the through-hole 95c of the first light shielding sheet 95 communicates with the opening 111.

The light source 56a, the light receiving element 56b, and the conversion IC 56c according to the third embodiment are mounted on, for example, a substrate 1c of the electronic device 1. The substrate 1c may be, for example, a motherboard of the electronic device 1 or a substrate of an extension card mounted on the electronic device 1.

The light source 56a of the wireless communication unit 56 and the light receiving element 61b of the wireless communication unit 61 face each other via the opening 111, and the sealing material 91 of the corresponding through-hole 82. The light source 56a emits the light L to the light receiving surface of the light receiving element 61b of the wireless communication unit 61, for example, through the opening 111 and the sealing material 91 of the corresponding through-hole 82.

The light receiving element 56b of the wireless communication unit 56 and the light source 61a of the wireless communication unit 61 face each other via the opening 111, and the sealing material 91 of the corresponding through-hole 82. The light receiving element 56b outputs, for example, an electric signal corresponding to the light L emitted from the light source 61a and incident on the light receiving surface through the opening 111 and the sealing material 91 of the corresponding through-hole 82.

Hereinafter, an example of the operation of the HDD 10 according to the third embodiment will be described. For example, in the write operation, the processor 1b of the electronic device 1 of FIG. 9 inputs the write signal to the conversion IC 56c of the wireless communication unit 56.

The conversion IC 56c converts the input write signal into the drive signal and outputs the drive signal to the light source 56a. The light source 56a emits the laser beam (light) L corresponding to the drive signal toward the light receiving element 61b of the wireless communication unit 61, through the opening 111 and the sealing material 91 of the through-hole 82. In other words, the light source 56a of the wireless communication unit 56 generates the light L corresponding to the electric signal (write signal) for the information to be written in each magnetic disk 12 by each magnetic head 15, toward the light receiving element 61b of the wireless communication unit 61 through the opening 111.

In response to incidence of the light L, the light receiving element 61b of the wireless communication unit 61 outputs the output signal corresponding to the light L to the conversion IC 61c. The conversion IC 61c converts (restores) the output signal to the write signal and outputs the write signal to the preamplifier 62. As described above, the light receiving element 61b of the wireless communication unit 61 generates the electric signal (write signal) representing information to be written to each magnetic disk 12 by each magnetic head 15, corresponding to the light L generated by the light source 56a of the wireless communication unit 56 and passing through the opening 111.

The preamplifier 62 amplifies the write signal and outputs the write signal to each magnetic head 15. The magnetic head 15 writes the intended data included in the write signal to the recording layer of the magnetic disk 12.

Meanwhile, in the read operation, when each magnetic head 15 reads intended data, the preamplifier 62 amplifies the read signal corresponding to the read data, and outputs the amplified read signal to the conversion IC 61c of the wireless communication unit 61. The conversion IC 61c converts the input read signal into the drive signal and outputs the drive signal to the light source 61a. The light source 61a emits the laser beam (light) L corresponding to the drive signal toward the light receiving element 56b of the wireless communication unit 56, through the opening 111 and the sealing material 91 of the through-hole 82. In other words, the light source 61a of the wireless communication unit 61 generates the light L corresponding to the electric signal (read signal) representing information read from each magnetic disk 12 by each magnetic head 15, and emits to the light receiving element 56b of the wireless communication unit 56, through the opening 111.

In response to incidence of the light L, the light receiving element 56b of the wireless communication unit 56 outputs the output signal corresponding to the light L, to the conversion IC 56c. The conversion IC 56c converts (restores) the output signal into the read signal and outputs the read signal to the processor 1b. As described above, the light receiving element 56b of the wireless communication unit 56 generates the electric signal (read signal) representing information read from each magnetic disk 12 by each magnetic head 15, corresponding to the light L emitted from the light source 61a of the wireless communication unit 61 and passing through the opening 111.

The processor 1b demodulates the read signal and acquires the data read from each magnetic disk 12. Note that a controller for the wireless communication unit 56 may be provided between the processor 1b and the wireless communication unit 56.

In the electronic device 1 according to the third embodiment described above, the PWB 51 is attached to the outside of the housing 11 and is electrically connected to the processor 1b. The housing 11 includes the bottom wall 25 covering the internal space S. The PWB 51 includes the inner surface 51a facing the bottom wall 25, and the outer surface 51b opposite the inner surface 51a, and is provided with the opening 111 opening to the inner surface 51a and the outer surface 51b. The light source 61a and the light receiving element 61b generate the electric signal (read signal) corresponding to the light L generated by the light source 56a and having passed through the opening 111, and/or generates and emits the light L to the light receiving element 56b through the opening 111. Thereby, the PWB 51 can avoid blocking the light L used in communications between the light source 61a and the light receiving element 61b and the light source 56a and the light receiving element 56b.

The electronic device 1 includes the HDD 10, the light source 56a and the light receiving element 56b, and the processor 1b. Thereby, the electronic device 1 can directly communicate with the light source 61a and light receiving element 61b, for example, instead of indirectly communicating through the PWB 51 of the HDD 10.

Fourth Embodiment

Figure 10:
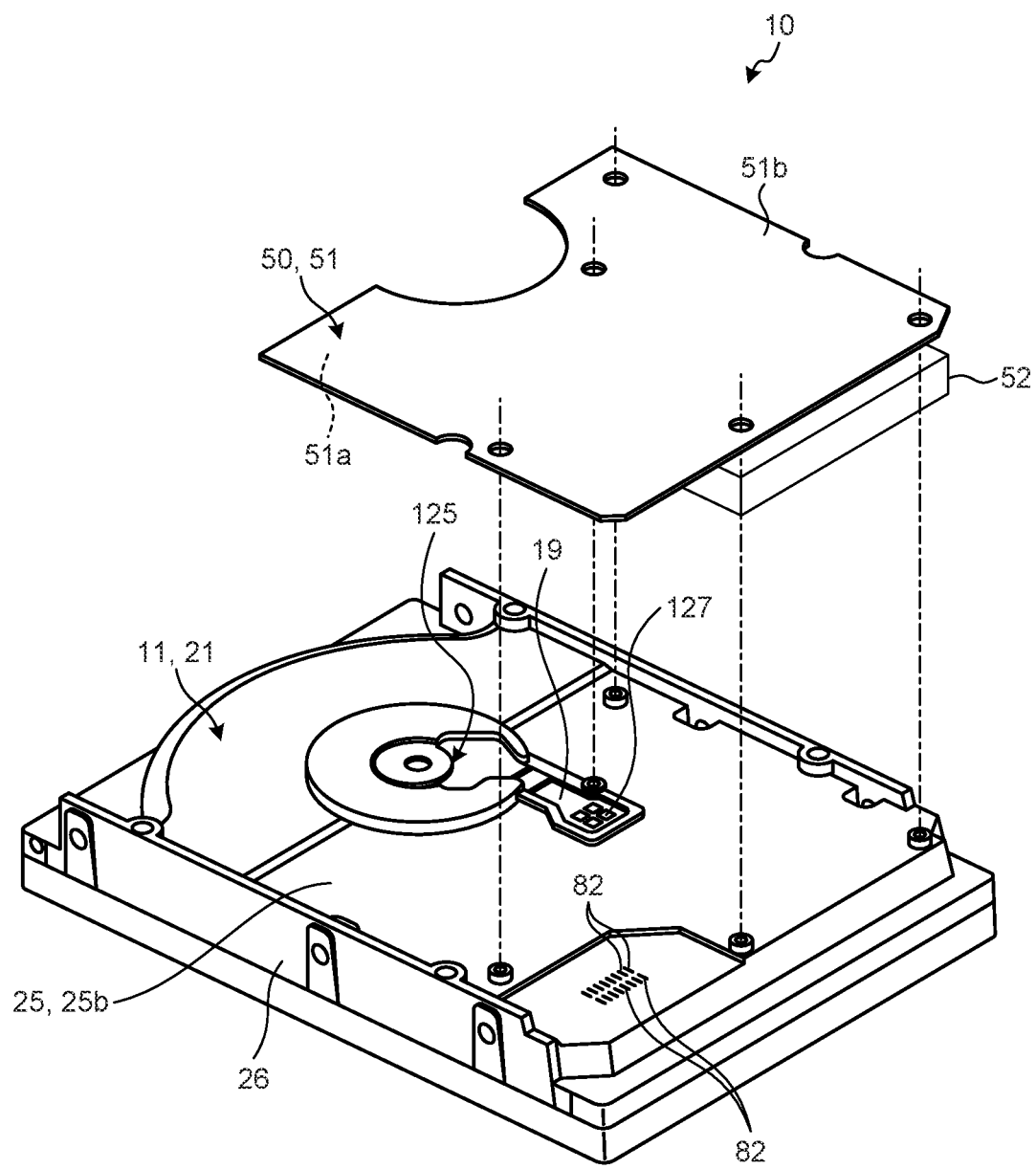
FIG. 10 is an exemplary exploded perspective view of the HDD according to a fourth embodiment.
Figure 11:
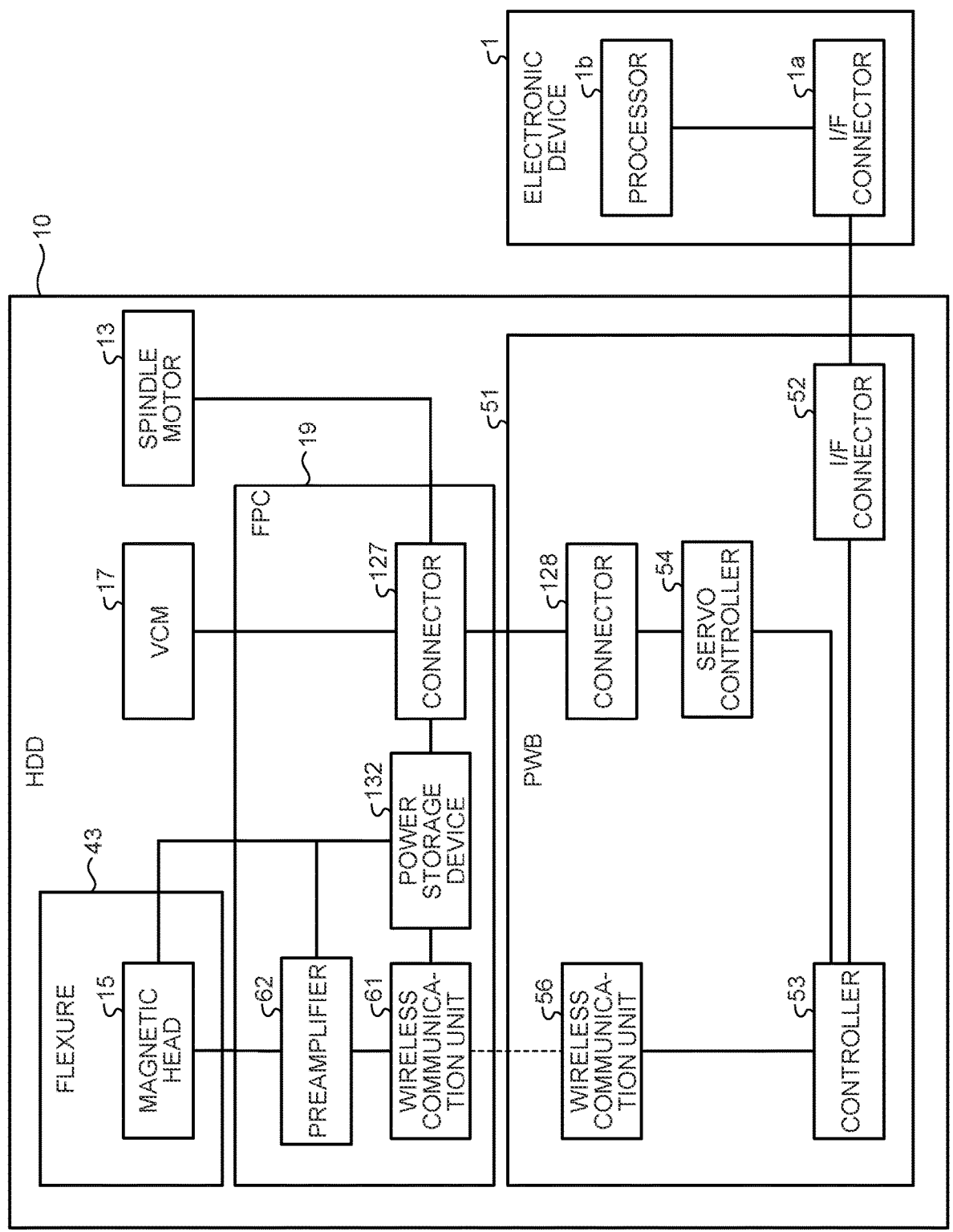
FIG. 11 is an exemplary block diagram illustrating a configuration of the HDD according to the fourth embodiment.

Hereinafter, a fourth embodiment will be described with reference to FIGS00209. 10 to 13. FIG. 10 is an exemplary exploded perspective view of the HDD 10 according to the fourth embodiment. FIG. 11 is an exemplary block diagram illustrating a configuration of the HDD 10 according to the fourth embodiment.

As illustrated in FIG. 10, in the HDD 10 according to the fourth embodiment, the relay FPC 65 of the first embodiment is omitted. As illustrated in FIG. 11, in the HDD 10 according to the fourth embodiment, instead of the relay FPC 65, the FPC 19 electrically connects the spindle motor 13 and the servo controller 54.

Figure 12:
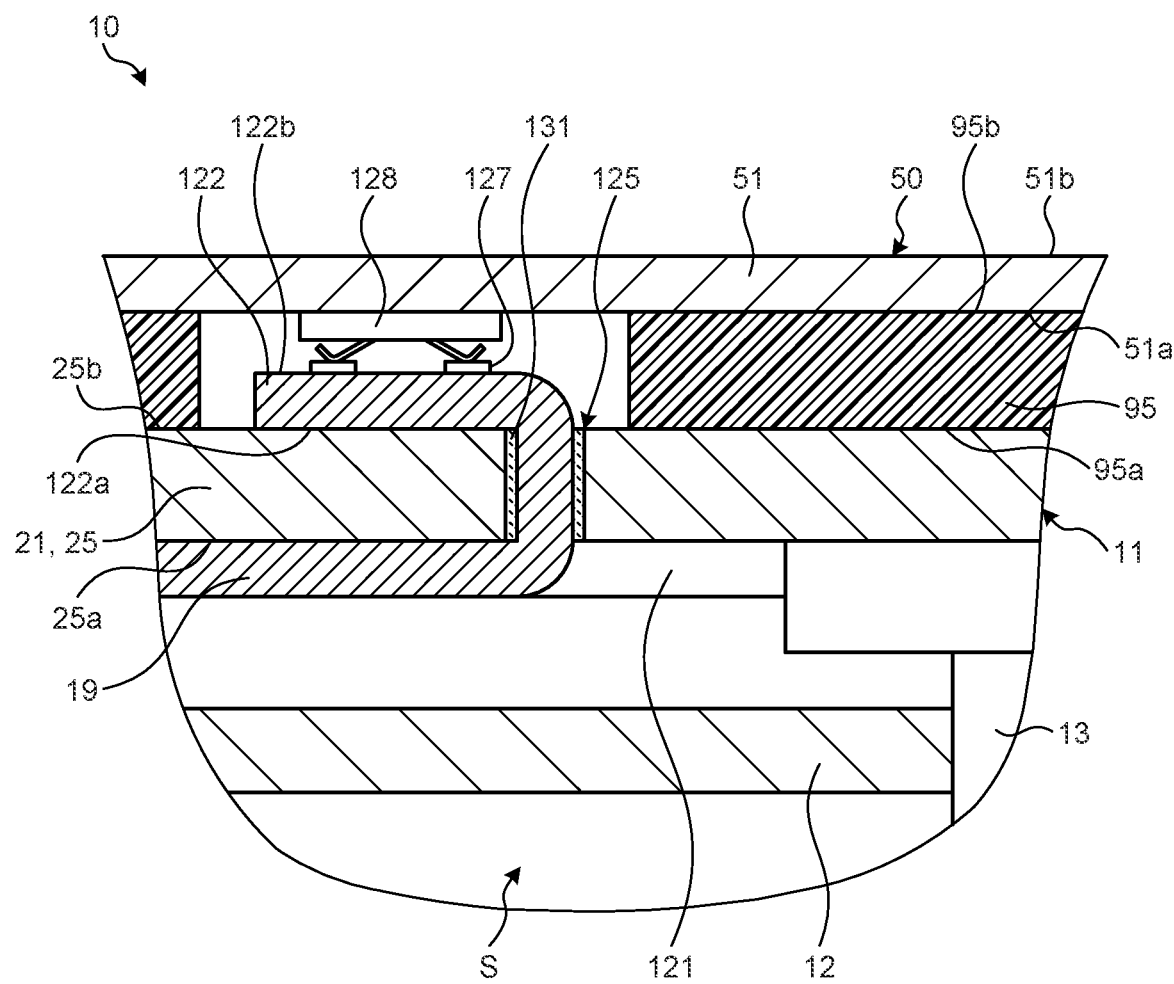
FIG. 12 is an exemplary cross-sectional view schematically illustrating a portion of the HDD according to the fourth embodiment.
Figure 13:
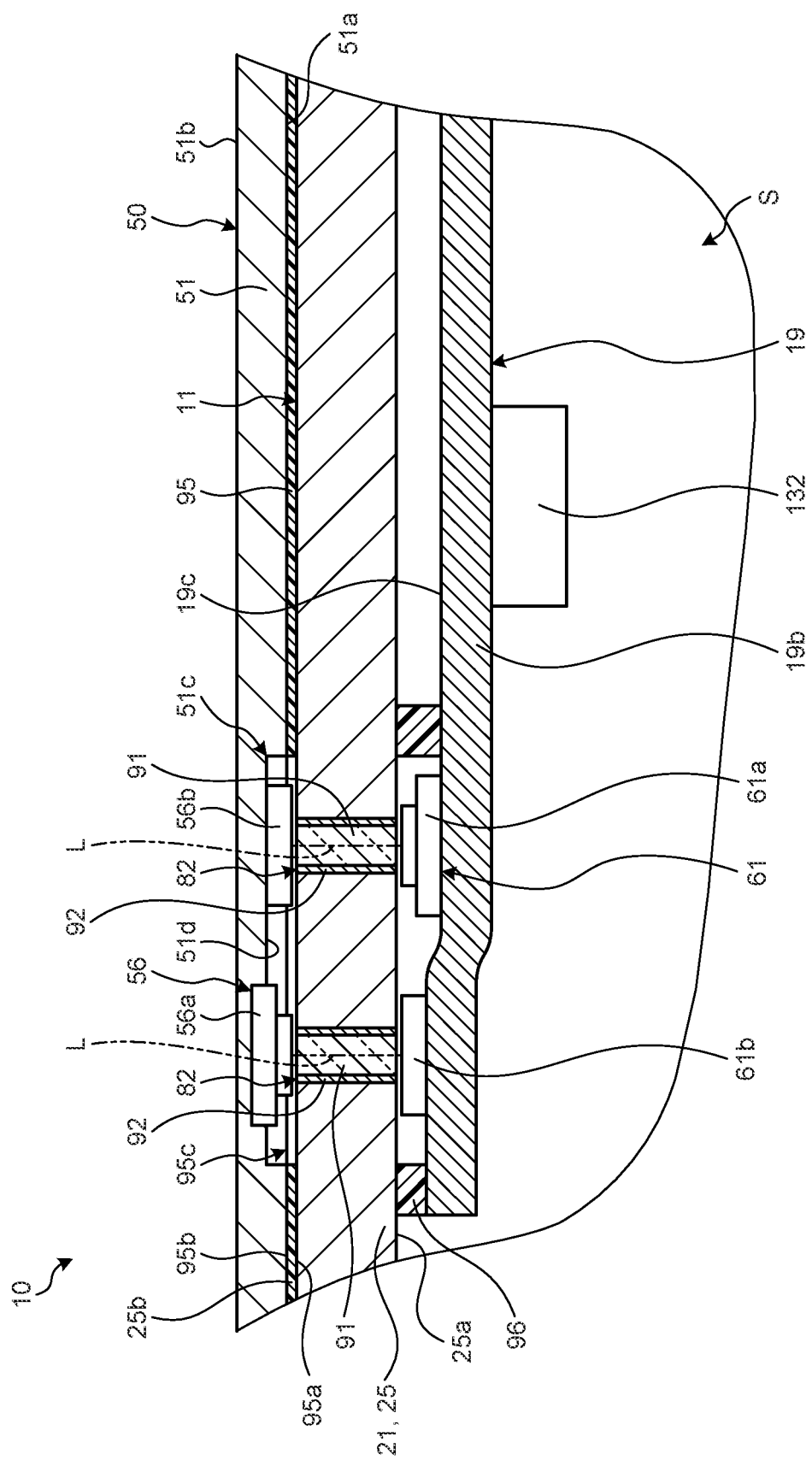
FIG. 13 is an exemplary cross-sectional view schematically illustrating another portion of the HDD according to the fourth embodiment.

FIG. 12 is an exemplary cross-sectional view schematically illustrating a portion of the HDD 10 according to the fourth embodiment. FIG. 13 is an exemplary cross-sectional view schematically illustrating another portion of the HDD 10 according to the fourth embodiment.

The FPC 19 according to the fourth embodiment, for example, branches into three. As illustrated in FIG. 12, the FPC 19 according to the fourth embodiment further includes a third end 121 and a fourth end 122. The third end 121 is electrically connected to the spindle motor 13.

The bottom wall 25 according to the fourth embodiment is provided with an insertion hole 125 instead of the insertion hole 81. The insertion hole 125 is an example of a third through-hole. The insertion hole 125 penetrates the bottom wall 25 and opens in the inner surface 25a and the outer surface 25b. The insertion hole 125 is in the form of, for example, a slit. The insertion hole 125 is located, for example, in the vicinity of the spindle motor 13 and is separated from the through-holes 82. Note that the position of the insertion hole 125 is not limited to this example.

The fourth end 122 of the FPC 19 passes through the insertion hole 125. In other words, part of the fourth end 122 penetrates the insertion hole 125. Another part of the fourth end 122 is located outside the housing 11 between the bottom wall 25 and the PWB 51.

The fourth end 122 includes an inner surface 122a and an outer surface 122b. The inner surface 122a faces the outer surface 25b of the bottom wall 25. The inner surface 122a is fixed on the outer surface 25b, for example, with an adhesive. The outer surface 122b is opposite the inner surface 122a. The outer surface 122b faces the inner surface 51a of the PWB 51 with spacing.

The HDD 10 according to the fourth embodiment includes connectors 127 and 128 instead of the relay connectors 55, 63, 71, and 72. The connector 127 is provided on the outer surface 122b of the fourth end 122. The connector 128 is provided on the inner surface 51a of the PWB 51. The connectors 127 and 128 are connected to each other. Therefore, the FPC 19 is electrically connected to the PCB 50 through the connectors 127 and 128.

In the fourth embodiment, power is supplied to the FPC 19 from the PCB 50 through the connectors 127 and 128. Power is supplied to the spindle motor 13 from the PCB 50 through the FPC 19 and the connectors 127 and 128.

The HDD 10 according to the fourth embodiment further includes a sealing material 131 of FIG. 12 and a power storage device 132 of FIG. 13. The sealing material 131 is an example of a second sealing material. The power storage device 132 is an example of an internal power supply.

As illustrated in FIG. 12, the sealing material 131 is filled in a gap between the fourth end 122 of the FPC 19 and the inner surface of the insertion hole 125. Therefore, the sealing material 131 hermetically seals the insertion hole 125. Furthermore, the sealing material 131 may bond the inner surface 122a of the fourth end 122 to the outer surface 25b of the bottom wall 25.

As illustrated in FIG. 13, the power storage device 132 is mounted on the FPC 19 in the internal space S. The power storage device 132 is located, for example, between the fourth end 122, and the first end 19a and the second end 19b. Note that the position of the power storage device 132 is not limited to this example.

The power storage device 132 is, for example, a capacitor. Note that the power storage device 132 may be another power supply such as a secondary battery. Power is supplied to the power storage device 132 from the PCB 50 through the FPC 19 and the connectors 127 and 128. The power storage device 132 stores the supplied power (electrical charge).

The power storage device 132 supplies the stored power to at least one of the magnetic heads 15, the light source 61a, and the preamplifier 62. For example, the power storage device 132 supplies the power to the light source 61a. The power that the power storage device 132 can supply to the light source 61a is larger than the power that the PCB 50 can supply to the spindle motor 13.

The power storage device 132 may determine whether to supply power to the light source 61a. For example, when power used by the light source 61a exceeds the power supplied to the light source 61a through the FPC 19 and the connectors 127 and 128, the power storage device 132 may supply the stored power to the light source 61a.

The power storage device 132 may be omitted. In this case, power is supplied to the magnetic heads 15, the light source 61a, and the preamplifier 62 from the PCB 50 through the FPC 19 and the connectors 127 and 128.

In the electronic device 1 according to the fourth embodiment described above, the spindle motor 13 is housed in the internal space S and rotates the magnetic disks 12. The FPC 19 passes through the insertion hole 125 in the housing 11, is electrically connected to the magnetic heads 15, the light source 61a, the PCB 50, and the spindle motor 13, and supplied with power from the PCB 50. The spindle motor 13 is supplied with power from the PCB 50 through the FPC 19. Thus, the HDD 10 according to the present embodiment can collectively supply power to the magnetic heads 15, the light source 61a, and the spindle motor 13 through the FPC 19. This eliminates the necessity for the housing 11 to be provided with separate through-holes for supply of power to the magnetic heads 15 and the light source 61a and for supply of power to the spindle motor 13, for example, which leads to preventing a leakage of gas from the internal space S. Furthermore, the sealing material 131 seals the insertion hole 125. Thereby, the HDD 10 can prevent a leakage of gas from the internal space S through the insertion hole 125. In addition, the HDD 10 can exclude the relay connectors 55, 63, 71, and 72, thus increasing the space around the light source 61a and the light receiving element 61b. This facilitates the assembly of the HDD 10, improving yield in manufacturing the HDD 10.

The power storage device 132 is mounted on the FPC 19 in the internal space S, receives and stores power from the PCB 50 through the FPC 19, and supplies the stored power to at least one of the magnetic heads 15, the light source 61a, and the preamplifier 62. Thereby, the power storage device 132 can supply larger power than the power supplied from the PCB 50 through the FPC 19, to at least one of the magnetic heads 15, the light source 61a, and the internal component. Because of this, the magnetic heads 15, the light source 61a, and the preamplifier 62 can operate by the power larger than the power by which the spindle motor 13 operates.

Fifth Embodiment

Figure 14:
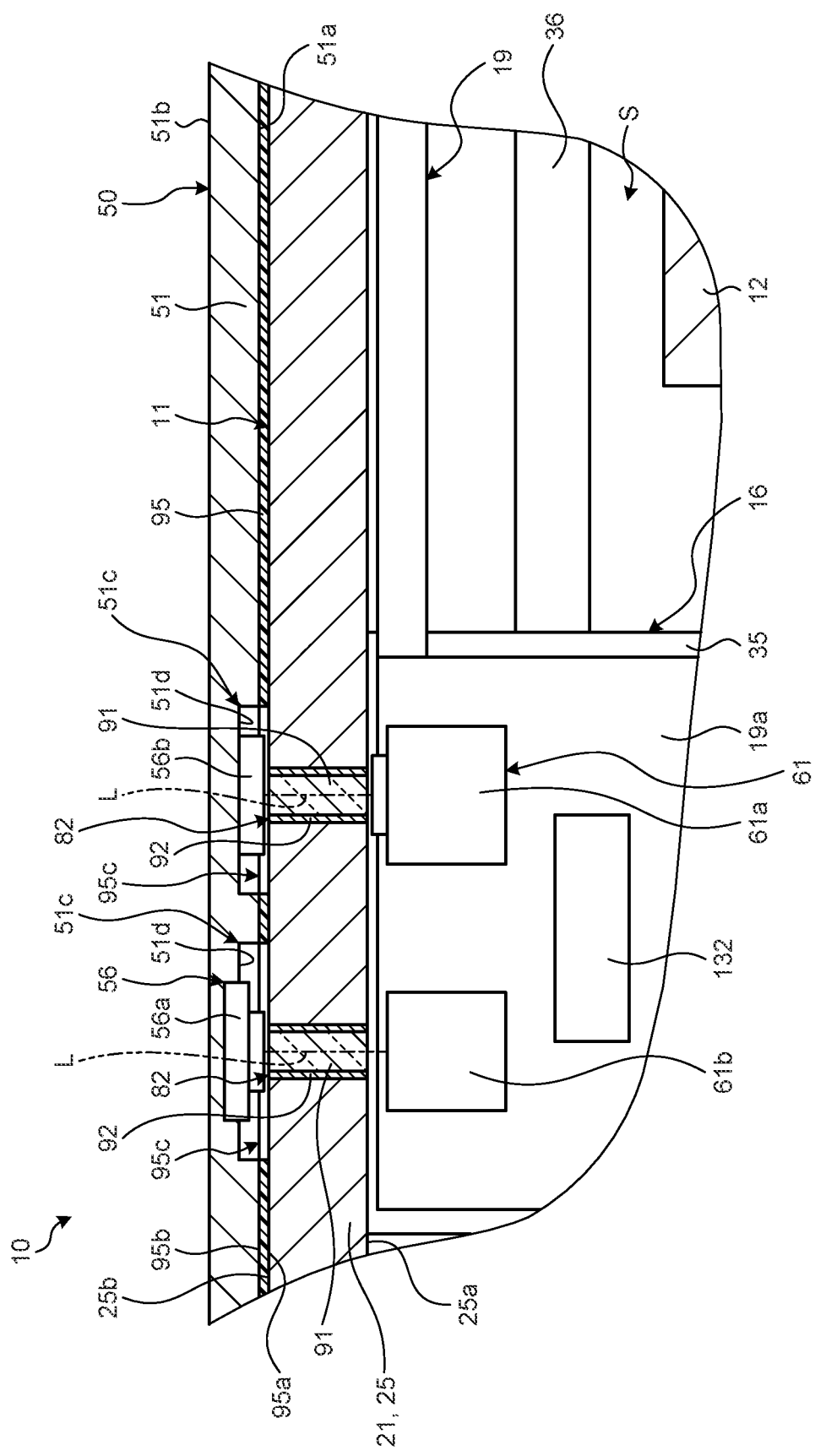
FIG. 14 is an exemplary cross-sectional view schematically illustrating a portion of the HDD according to a fifth embodiment.

Hereinafter, a fifth embodiment will be described with reference to FIG. 14. FIG. 14 is an exemplary cross-sectional view schematically illustrating a portion of the HDD 10 according to the fifth embodiment. The fifth embodiment is a modification of the fourth embodiment, and is substantially the same as the fourth embodiment except for the following description.

In the fifth embodiment, the FPC 19 can omit the second end 19b. The light source 61a, the light receiving element 61b, and the conversion IC 61c of the wireless communication unit 61 are attached to the first end 19a. Therefore, the light source 61a and the light receiving element 61b rotate about the support shaft 31 together with the actuator block 35.

In the fifth embodiment, the through-holes 82 and the sealing materials 91 are each formed into a substantially arcuate shape extending around the support shaft 31. Therefore, even when the light source 61a and the light receiving element 61b rotate about the support shaft 31, the light source 61a and the light receiving element 61b face the corresponding through-holes 82 and sealing materials 91.

The light sources 56a and 61a according to the fifth embodiment are, for example, LEDs. Therefore, the light L generated by the light sources 56a and 61a according to the fifth embodiment is more easily diffused than the light L generated by LD.

In the fifth embodiment, the PWB 51 is provided with a plurality of recesses 51c. The light source 56a is located in one of the plurality of recesses 51c. The light receiving element 56b is located in another one of the plurality of recesses 51c. Furthermore, the first light shielding sheet 95 is provided with a plurality of the through-holes 95c. The through-holes 95c communicate with the corresponding recesses 51c.

The light source 61a emits the light L to the light receiving element 56b through the sealing material 91 of the through-hole 82. The light L generated by the light source 61a is diffused, and thus, the light L is easily incident on the light receiving surface of the light receiving element 56b even when the light source 61a rotates about the support shaft 31.

The light source 56a emits the light L to the light receiving element 61b through the sealing material 91 of the corresponding through-hole 82. The light L generated by the light source 56a is diffused, and thus, the light L is easily incident on the light receiving surface of the light receiving element 61b even when the light receiving element 61b rotates about the support shaft 31.

The recess 51c in which the light source 56a is located is separated from the recess 51c in which the light receiving element 56b is located. Therefore, the recess 51c is configured to suppress incidence of the light L emitted from the light source 56a on the light receiving element 56b.

In the electronic device 1 according to the fifth embodiment described above, the light source 61a and the light receiving element 61b are mounted on the part, of the FPC 19, attached to the actuator assembly 16 that rotates about the support shaft 31. This makes it possible to shorten the FPC 19 in length in the HDD 10.

In the above embodiments, the wireless communication units 56 and 61 perform wireless communications using the light L. However, the wireless communication units 56 and 61 are not limited to this example, and may perform wireless communications by using a magnetic field or an electric field. In other words, the wireless communication unit 61 generates at least one of: the electric signal representing information to be written to each magnetic disk 12 by each magnetic head 15 corresponding to light, a magnetic field, or an electric field generated by the wireless communication unit 56; and the light, magnetic field, or electric field corresponding to the electric signal representing information read from each magnetic disk 12 by each magnetic head 15, toward the wireless communication unit 56. In addition, the wireless communication unit 56 generates at least one of: the electric signal corresponding to the light, magnetic field, or electric field generated by the wireless communication unit 61; and light, a magnetic field, or an electric field corresponding to the electric signal representing information to be written to each magnetic disk 12 by each magnetic head 15, toward the wireless communication unit 61.

The wireless communication units 56 and 61 as exemplary digital isolators perform wireless communications between the PCB 50 or processor 1b outside the housing 11 and the preamplifier 62 in the internal space S. The HDD 10 is capable of performing communications between the inside and outside of the housing 11 using any of light, magnetic field, and electric field without the relay connectors 71 and 72. Thereby, the HDD 10 can exclude the pins (terminals) for communicating the write signal and the read signal from the relay connectors 71 and 72, for example. This makes it possible for the HDD 10 to implement, for example, downsizing or omission of the relay board 75 and the relay connectors 71 and 72, and prevent a leakage of gas from the internal space S. Furthermore, the HDD 10 can prevent a decrease in positioning accuracy between the components and an increase in design cost.

The above embodiments have described the example that the FPC 19 placed inside the housing 11 is supplied with power in a wired manner through the wired connection 70. Alternatively, the FPC 19 may be supplied with power wirelessly.

Furthermore, the above embodiments have described the example that the wireless communication units 56 and 61 perform bidirectional wireless communications. However, the wireless communication units 56 and 61 may perform one-directional wireless communications. In one-directional wireless communications from the wireless communication unit 61 to the wireless communication unit 56, for example, the wireless communication unit 61 may omit the light receiving element 61b and the wireless communication unit 56 may omit the light source 56a, and the HDD 10 may be used as a read-only storage device.

According to at least one of the embodiments described above, the disk device includes the housing, the disk-shaped recording medium, the magnetic heads, the internal wireless communication device, and the internal component. A internal space is provided inside the housing. The recording medium is housed in the internal space and includes the recording layer. The magnetic head is housed in the internal space, and is configured to read and write the information from and to the recording medium. The internal wireless communication device performs at least one of generation of the electric signal for the information to be written in the recording medium by the magnetic head, corresponding to the light, magnetic field, or electric field generated by the external wireless communication device, and generation of the light, magnetic field, or electric field corresponding to the electric signal of the information read from the recording medium by the magnetic head, toward the external wireless communication device. The internal component is housed in the internal space, is electrically connected to the magnetic heads, and communicates with the external component outside the housing, through the internal wireless communication device and the external wireless communication device. For example, in order to transmit and receive the write signal and the read signal between the internal component and the external component, the disk device has the connectors that is mounted thereon and the relay board that closes the through-hole of the housing, in some cases. The relay board and the connector may increase in size as the write signal and the read signal increase in capacity. The increasing size of the relay board may cause leakage of the gas in the internal space through the fine holes in the relay board or an adhesive portion between the housing and the relay board, the decrease in positioning accuracy between the components including the connectors, and the increase in the design cost for designing new large board and connectors. Meanwhile, the disk device according to the present embodiment performs communication of the write signal and the read signal between the internal component and the external component via the light, magnetic field, or electric field. Therefore, in the disk device, for example, it is not necessary to provide a connector (pin) for communication of the write signal and the read signal. Therefore, the disk device enables, for example, suppression of the leakage of the gas in the internal space. Furthermore, the disk device enables suppression of the decrease in positioning accuracy between the components and the increase in design cost.

In the above description, wards "prevent" and "suppress" are defined as, for example, to prevent an event, action, or influence, or to reduce the degree of the event, action, or influence. Furthermore, in the above description, wards "limit" and "restrict" are defined as, for example, to prevent movement or rotation, or to permit movement or rotation within a predetermined range and to prevent movement or rotation beyond the predetermined range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a housing having an internal space;
   a recording medium having a disk form, housed in the internal space, and including a recording layer;
   a magnetic head housed in the internal space, the magnetic head configured to read and write information from and to the recording medium;
   an internal wireless communication device, housed in the internal space;
   an external wireless communication device mounted on an outside of the housing;
   an internal component housed in the internal space and electrically connected to the magnetic head; and
   an external component including a first circuit board attached to the outside of the housing, wherein
   the internal component and the external component are each configured to communicate with each other through the internal wireless communication device and the external wireless communication device,
   the internal wireless communication device is configured to perform at least one of:
   (i) generate light, a magnetic field, or an electric field towards the external wireless communication device, and
   (ii) generate an electric signal corresponding to the light, a magnetic field, or an electric field received from the external wireless communication device, the electric signal representing information to be written to or read from the recording medium by the magnetic head,
   the external wireless communication device is configured to perform at least one of:
   (iii) generate light, a magnetic field, or an electric field towards the internal wireless communication device, and
   (iv) generate an electric signal corresponding to the light, a magnetic field, or an electric field received from the internal wireless communication device, the electric signal representing information to be written to or read from the recording medium by the magnetic head,
   the housing includes a first wall that covers the internal space,
   the first circuit board includes a first surface facing the first wall, and a recess recessed from the first surface, and
   the external wireless communication device is mounted in the recess of the first circuit board.

2. A disk device comprising:
   a housing having an internal space;
   a recording medium having a disk form, housed in the internal space, and including a recording layer;
   a magnetic head housed in the internal space, the magnetic head configured to read and write information from and to the recording medium;
   an internal wireless communication device, housed in the internal space;
   an external wireless communication device mounted on an outside of the housing;
   an internal component housed in the internal space and electrically connected to the magnetic head; and
   an external component including a first circuit board attached to the outside of the housing, wherein
   the internal component and the external component are each configured to communicate with each other through the internal wireless communication device and the external wireless communication device,
   the internal wireless communication device is configured to perform at least one of:
   (i) generate light, a magnetic field, or an electric field towards the external wireless communication device, and
   (ii) generate an electric signal corresponding to the light, a magnetic field, or an electric field received from the external wireless communication device, the electric signal representing information to be written to or read from the recording medium by the magnetic head,
   the external wireless communication device is configured to perform at least one of:
   (iii) generate light, a magnetic field, or an electric field towards the internal wireless communication device, and
   (iv) generate an electric signal corresponding to the light, a magnetic field, or an electric field received from the internal wireless communication device, the electric signal representing information to be written to or read from the recording medium by the magnetic head,
   the housing includes a first wall that covers the internal space and a first through-hole penetrating the first wall, and
   the internal wireless communication device generates an electric signal corresponding to light emitted from the external wireless communication device through the first through-hole, and/or emits light to the external wireless communication device through the first through-hole.

3. The disk device according to claim 2, further comprising:
   a light shielding member located between the first circuit board and the housing, to surround the external wireless communication device to block light.

4. The disk device according to claim 2, wherein
   the housing includes a transparent or translucent first sealing material that seals the first through-hole, and
   the internal wireless communication device generates an electric signal corresponding to light emitted from the external wireless communication device through the first sealing material, and/or emits light to the external wireless communication device through the first sealing material.

5. The disk device according to claim 1, further comprising:
- a motor housed in the internal space to rotate the recording medium;
- a flexible printed wiring board that passes through a third through-hole in the housing, to be electrically connected to the magnetic head, the internal wireless communication device, the external component, and the motor, and that receives supply of power from the external component; and
- a second sealing material that seals the third through-hole, wherein
- the motor is supplied with power from the external component through the flexible printed wiring board.

6. The disk device according to claim 5, further comprising
- an internal power supply mounted on the flexible printed wiring board in the internal space, to store power supplied from the external component through the flexible printed wiring board, and supply the power to at least one of the magnetic head, the internal wireless communication device, and the internal component.

7. The disk device according to claim 1, further comprising:
- a communication unit comprising:
- the internal wireless communication device,
- the external wireless communication device, and
- a casing that holds the internal wireless communication device and the external wireless communication device apart from each other and covers the internal wireless communication device and the external wireless communication device, wherein
- the housing includes a first wall that covers the internal space, and a fourth through-hole that penetrates the first wall, and
- the communication unit is at least partly disposed inside the fourth through-hole.

8. The disk device according to claim 1, further comprising:
- a second circuit board attached to an outside of the housing and electrically connected to the external component, wherein
- the housing includes a first wall that covers the internal space,
- the second circuit board includes a first surface facing the first wall, a second surface opposite the first surface, and a fifth through-hole opening to the first surface and the second surface, and
- the internal wireless communication device is configured to perform at least one of:
  - (v) generate an electric signal corresponding to light, a magnetic field, or an electric field generated by the external wireless communication device and having passed through the fifth through-hole, and
  - (vi) generate light, a magnetic field, or an electric field toward the external wireless communication device through the fifth through-hole.

9. A disk device comprising:
- a housing having an internal space;
- a recording medium having a disk form, housed in the internal space, and including a recording layer;
- a magnetic head housed in the internal space, the magnetic head configured to read and write information from and to the recording medium;
- an internal wireless communication device, housed in the internal space;
- an external wireless communication device mounted on an outside of the housing;
- an internal component housed in the internal space and electrically connected to the magnetic head;
- an external component including a first circuit board attached to the outside of the housing; and
- a connection that electrically connects the external component and the internal component, wherein
- the internal component and the external component are each configured to communicate with each other through the internal wireless communication device and the external wireless communication device,
- the internal wireless communication device is configured to perform at least one of:
  - (i) generate light, a magnetic field, or an electric field towards the external wireless communication device, and
  - (ii) generate an electric signal corresponding to the light, a magnetic field, or an electric field received from the external wireless communication device, the electric signal representing information to be written to or read from the recording medium by the magnetic head,
- the external wireless communication device is configured to perform at least one of:
  - (iii) generate light, a magnetic field, or an electric field towards the internal wireless communication device, and
  - (iv) generate an electric signal corresponding to the light, a magnetic field, or an electric field received from the internal wireless communication device, the electric signal representing information to be written to or read from the recording medium by the magnetic head,
- the housing includes a first wall that covers the internal space and is provided with a second through-hole, and a second wall that closes the second through-hole,
- the connection includes:
  - a first connector located on the second wall outside the housing and electrically connected to the external component, and
  - a second connector located on the second wall inside the internal space and electrically connected to the first connector, and
- the internal component is electrically connected to the second connector to receive supply of power from the external component through the first connector and the second connector.

* * * * *